US012633680B2

(12) United States Patent
Kasturi et al.

(10) Patent No.: US 12,633,680 B2
(45) Date of Patent: May 19, 2026

(54) SPATIALLY RECONFIGURABLE ANTENNA ARRAY

(71) Applicant: Intel Corporation, Santa Clara, CA (US)

(72) Inventors: Sreenivas Kasturi, Hillsboro, OR (US); Xi Li, Chandler, AZ (US); Gregory Chance, Chandler, AZ (US); Wayne Ballantyne, Chandler, AZ (US); Bruce Geren, Chandler, AZ (US); Peter Pawliuk, Tempe, AZ (US); Nebil Tanzi, Hoffman Estates, IL (US)

(73) Assignee: Intel Corporation, Santa Clara, CA (US)

( * ) Notice: Subject to any disclaimer, the term of this patent is extended or adjusted under 35 U.S.C. 154(b) by 117 days.

(21) Appl. No.: 18/549,356

(22) PCT Filed: Jun. 24, 2021

(86) PCT No.: PCT/US2021/038784
§ 371 (c)(1),
(2) Date: Sep. 7, 2023

(87) PCT Pub. No.: WO2022/271172
PCT Pub. Date: Dec. 29, 2022

(65) Prior Publication Data

US 2024/0154324 A1 May 9, 2024

(51) Int. Cl.
*H01Q 21/08* (2006.01)
*H01Q 1/22* (2006.01)
(Continued)

(52) U.S. Cl.
CPC ......... *H01Q 25/002* (2013.01); *H01Q 1/2266* (2013.01); *H01Q 1/243* (2013.01); *H01Q 21/08* (2013.01); *H01Q 21/28* (2013.01)

(58) Field of Classification Search
None
See application file for complete search history.

(56) References Cited

U.S. PATENT DOCUMENTS 11,115,510 B1 * 9/2021 Abdul-Gaffoor ...... H01Q 21/08
2014/0266953 A1 9/2014 Yen
(Continued)

FOREIGN PATENT DOCUMENTS

KR 101346137 B1 12/2013

OTHER PUBLICATIONS

International Search Report issued for the corresponding PCT patent application No. PCT/US2021/038784, dated Mar. 18, 2022, 4 pages (For informational purposes only).

*Primary Examiner* — David E Lotter
*Assistant Examiner* — Anh N Ho
(74) *Attorney, Agent, or Firm* — Viering, Jentschura & Partner mbB

(57) ABSTRACT

Disclosed herein are antenna systems, methods, and devices. The device includes a first portion including a first antenna array; and a second portion including a second antenna array, wherein the first portion and the second portion are movable with respect to one another, and wherein the first antenna array and the second antenna array are arranged such that in a first relative position of the first portion and the second portion with respect to one another the first antenna array and the second antenna array operate in combination with one another, and in a second relative position of the first portion and the second portion with respect to one another the first antenna array and the second antenna array operate independently of one another.

18 Claims, 8 Drawing Sheets

(51) Int. Cl.

| | |
|---|---|
| ***H01Q 1/24*** | (2006.01) |
| ***H01Q 21/28*** | (2006.01) |
| ***H01Q 25/00*** | (2006.01) |

(56) References Cited

U.S. PATENT DOCUMENTS

| | | | | |
|---|---|---|---|---|
| 2015/0222013 | A1* | 8/2015 | Choi | H04B 7/02 343/879 |
| 2020/0014119 | A1* | 1/2020 | Kim | H01Q 1/523 |
| 2020/0194904 | A1* | 6/2020 | Huh | H01Q 21/065 |
| 2021/0066817 | A1* | 3/2021 | Tehran | H01Q 21/065 |
| 2021/0143551 | A1 | 5/2021 | Zekios et al. | |
| 2021/0175640 | A1 | 6/2021 | Desclos et al. | |
| 2022/0094051 | A1* | 3/2022 | Ameer P | H01Q 21/26 |
| 2024/0243468 | A1* | 7/2024 | Shen | H01Q 21/28 |

* cited by examiner

SPATIALLY RECONFIGURABLE ANTENNA ARRAY

CROSS-REFERENCE TO RELATED APPLICATION(S)

This application is a national phase application of PCT/US2021/038784 filed on Jun. 24, 2021, the contents of which is fully incorporated herein by reference.

TECHNICAL FIELD

This disclosure relates generally to components, systems, and methods for providing a spatially reconfigurable and scalable antenna array.

BACKGROUND

Devices that include wireless networking components use antennas to transmit and/or receive radio frequency (RF) communication signals. 5G mmW (millimeter-Wave) RF communication relies on antenna beamforming, and the RF performance is dependent on the number of antennas, the antenna location, and their configuration. At present, various devices may implement 5G communication, such as base stations (BSs), customer-premises equipment (CPE, also referred to as customer-provided equipment), or user equipment (UE), as examples. By way of example, a type of device for 5G communication may be a foldable device, such as a foldable laptop, a foldable tablet, or a foldable phone (e.g., a tablet or phone with a foldable screen).

BRIEF DESCRIPTION OF THE DRAWINGS

Throughout the drawings, like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which.

DESCRIPTION

Figure 1:
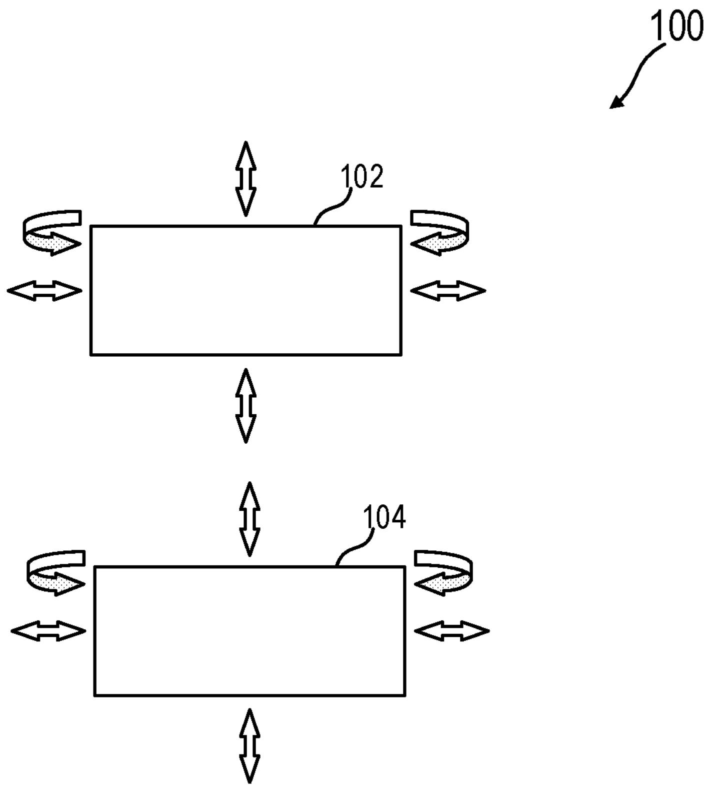
FIG. 1 exemplarily shows a device having a first portion and a second portion in a schematic view.

The following detailed description refers to the accompanying drawings that show, by way of illustration, specific details and aspects in which the disclosure may be practiced. One or more aspects are described in sufficient detail to enable those skilled in the art to practice the disclosure. Other aspects may be utilized and structural, logical, and electrical changes may be made without departing from the scope of the disclosure. The various aspects described herein are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa. Throughout the drawings, it should be noted that like reference numbers are used to depict the same or similar elements, features, and structures.

This disclosure generally relates to an optimized use of the space available in a device (e.g., a 5G device) for placing and orienting antennas, e.g. to an optimized disposition of antennas within a device. In a spatially reconfigurable device (e.g., a spatially reconfigurable 5G device, for example a small cell base station, a CPE, or a UE), there may be spatial movement of one part of the device with respect to another part (or the other parts) of the device. The spatial movement may be inherent/natural in the device (e.g., in a foldable phone, in a laptop, etc.), or may be an intentional/additional feature. This disclosure may generally be based on the realization that the (inherent or intentional) spatial movement of different parts of a device may be advantageously exploited for placing and configuring antennas in the device. Antenna elements or (partial) antenna arrays may be disposed (e.g., integrated, or embedded) on movable parts of a device, thus providing a dynamically adaptable and scalable configuration in which the antenna elements/arrays may operate independently of one another or in combination with one another depending on the relative position of the movable parts of the device. The approach described herein may provide adapting the size (e.g., the number of elements) of an antenna array in a scalable platform (e.g., a scalable 5G platform).

In a conventional 5G mmW (5G millimeter Wave) design or system the spatial movement and relative position of antenna modules in a device is not taken into account or is not used to adaptably change the size of an antenna array. In a conventional device in order to have higher RF performance (e.g., a greater Effective Isotropic Radiated Power, EIRP) the output power of the power amplifier (PA) driving each antenna element may be increased, or the number of antenna elements in an array module may be increased. However, a higher output power of the power amplifier(s) may result in higher power consumption of the device, and increasing the number of antenna elements in an array may require larger printed circuit board (PCB) area and/or product volume.

In a conventional mechanically reconfigurable antenna the spatial movement is an intentional exercise for the specific purpose of improving the antenna element performance and not for the purpose of dynamically changing the size of an antenna array. In addition, spatially reconfigurable antenna elements may require dedicated mechanical mechanisms that can be complex.

This disclosure may relate to a design of a 5G mmW system in a spatial reconfigurable (e.g., foldable) device including antenna array modules, radio frequency (RF) heads, and RF transceiver(s) arranged in a way that takes advantage of the spatial movement of different parts of the device to provide improved RF performance without increasing power consumption, product volume, or mechanical complexity. Described herein are methods and apparatus of antenna array module design, placement and configuration, as well as 5G mmW systems and silicon hardware with improved RF performance by taking advantage of the spatial movement to dynamically adapt the array size (e.g., the number of elements) in a scalable 5G platform. By configuring the physical location of the antenna elements, they may provide separate smaller arrays or may form a larger combined array, thus providing a dynamically adaptable configuration.

A device may include a first portion including a first antenna element and a second portion including a second antenna element. The first portion and the second portion are movable with respect to one another. The first antenna element and the second antenna element are arranged such that in a first relative position of the first portion and the second portion with respect to one another the first antenna element and the second antenna element operate in combination with one another, and in a second relative position of the first portion and the second portion with respect to one another the first antenna element and the second antenna element operate independently of one another.

A device may include a first portion including a first antenna array, and a second portion including a second antenna array. The first portion and the second portion are movable with respect to one another. The first antenna array and the second antenna array are arranged such that in a first relative position of the first portion and the second portion with respect to one another the first antenna array and the second antenna array operate in combination with one another, and in a second relative position of the first portion and the second portion with respect to one another the first antenna array and the second antenna array operate independently of one another.

A device may include a first antenna array and a second antenna array. The first antenna array and the second antenna array are movable with respect to one another. The device may further include a processor configured to: provide a first beamforming configuration for the first antenna array and the second antenna array in the case that the first antenna array and the second antenna array are in a first relative position with respect to one another in which the first antenna array and the second antenna array operate in combination with one another, and provide a second beamforming configuration for the first antenna array and the second antenna array in the case that the first antenna array and the second antenna array are in a second relative position with respect to one another in which the first antenna array and the second antenna array operate independently of one another.

A processor may be configured to: provide a first beamforming configuration in the case that a first antenna element (or a first antenna array) and a second antenna element (or a second antenna array) are in a first relative position with respect to one another in which the first antenna element and the second antenna element operate in combination with one another, and provide a second beamforming configuration in the case that the first antenna element and the second antenna element are in a second relative position with respect to one another in which the first antenna element and the second antenna element operate independently of one another.

A method of operating a device may include moving a first portion of the device and a second portion of the device with respect to one another to provide a first configuration in which a first antenna array of the first portion and a second antenna array of the second portion operate in combination with one another; and moving the first portion of the device and the second portion of the device with respect to one another to provide a second configuration in which the first antenna array of the first portion and the second antenna array of the second portion operate independently of one another.

A method of operating antenna elements may include providing a first beamforming configuration in the case that a first antenna element and a second antenna element are in a first relative position with respect to one another in which the first antenna element and the second antenna element operate in combination with one another, and providing a second beamforming configuration in the case that the first antenna element and the second antenna element are in a second relative position with respect to one another in which the first antenna element and the second antenna element operate independently of one another.

A method of operating antenna arrays may include: providing a first beamforming configuration in the case that a first antenna array and a second antenna array are in a first relative position with respect to one another in which the first antenna array and the second antenna array operate in combination with one another, and providing a second beamforming configuration in the case that the first antenna array and the second antenna array are in a second relative position with respect to one another in which the first antenna array and the second antenna array operate independently of one another.

Various aspects are described herein in relation to applications for the 5G technology standard (Fifth Generation (5G) mobile networks), e.g. various aspects are described in relation to devices, antenna elements, antenna arrays, etc. that may be configured for 5G applications (e.g., an antenna element or an antenna array may be configured to transmit/receive RF waves in the millimeter wavelength range). It is however understood that a configuration for 5G applications is only an example, and the strategy described herein may apply in a corresponding manner to devices, antenna elements, antenna arrays, etc. configured for other types of technologies or technology standards, e.g., WiFi, Bluetooth (BT), near-field communication (NFC), Global System for Mobile Communications (GSM), New Radio (NR), Universal Mobile Telecommunications Service (UMTS), Long Term Evolution (LTE), 2G, 2.5G, 3G, 3.5G, 4G, 3GPP, 6G, 7G, 8G as other examples.

The term “antenna” or “antenna structure”, as used herein, may include any suitable configuration, structure and/or arrangement of one or more antenna elements, components, units, assemblies and/or arrays. As an example, an antenna may implement transmit and receive functionalities using separate transmit and receive antenna elements. As another example, an antenna may implement transmit and receive functionalities using common and/or integrated transmit/receive elements. An antenna may include, for example, a phased array antenna, a single element antenna, a set of switched beam antennas, and/or the like.

The term “antenna element”, as used herein, may include an element of an antenna, e.g. an element of an antenna array. An antenna element may be understood as an individual component capable of transmitting and/or receiving radio frequency communication signals, illustratively capable of transmitting and/or receiving radio frequency waves. An antenna element may operate in combination with one or more other antenna elements, e.g. as part of an antenna array, to provide combined transmission/reception of radio frequency communication signals, e.g. to provide beamforming capabilities for transmitting/receiving radio frequency waves. As examples, an antenna element may include a microstrip patch antenna element, a horn antenna element, a dipole antenna element, a helical antenna element, or a parabolic antenna element. An antenna element as described herein may have overall dimensions for use in relatively small devices, e.g. a relatively small base station or a portable user equipment. As a numerical example, an antenna element as described herein may have lateral dimensions (e.g., a height, a width, and/or a thickness) in the range from 50 μm to 10 cm, for example in the range from 100 μm to 5 mm. For example, an antenna element as described herein may be formed on (e.g., integrated in) a semiconductor substrate, or in a package containing the semiconductor integrated circuit.

The term “antenna array”, as used herein, may describe an ordered arrangement of one or more antenna elements. An antenna array may include a number of antenna elements disposed in a number N of columns and a number M of rows, with at least one of N and/or M being greater than 1. The arrangement of the antenna elements within an antenna array may be in accordance with a desired operation of the antenna array (e.g., in accordance with desired beamforming capabilities of the antenna array). As an example the antenna elements of an antenna array may be disposed along one direction (e.g., one of the horizontal direction or the vertical direction) and may form a one-dimensional antenna array. As another example, the antenna elements of an antenna array may be disposed along two directions (e.g., along both the horizontal direction and the vertical direction) and may form a two-dimensional antenna array (e.g., a square array or a rectangular array, as examples). The antenna elements of an antenna array may be configured to operate in combination with one another to provide a desired radiation pattern, e.g. a processor may control the transmission/reception of radio frequency waves of the antenna elements of the antenna array to provide beamfroming (illustratively, to transmit/receive a stronger signal in a specific direction, as known in the art).

FIG. 1, exemplarily shows a device 100. The device 100 may be configured for wireless communication. Illustratively, the device 100 may include various components to implement transmission and/or reception of radio frequency communication signals (e.g., an antenna, a MODEM, one or more RF transceivers, a processor, one or more RF heads, etc., to control and actuate the transmission/reception of radio frequency communication signals), as described in further detail below (see FIG. 2A to FIG. 4). As examples, the device 100 may be or may include a base station, a user equipment, a laptop, a 2-in-1 device, a tablet, a smartphone, or a customer premise equipment. As an exemplary application technology, the device 100 may be a 5G device, e.g. the device 100 may be configured for communication over the 5G network (illustratively, the components of the device 100 may be configured to enable communication in the 5G frequency range, e.g. from 450 MHz to 6 GHz and/or from 24.25 GHz to 52.6 GHz). The device 100 may be a mobile device (e.g., in the case that the device 100 is a laptop, a tablet, a smartphone, etc.) or a stationary device (e.g., in the case that the device 100 is a base station).

The device 100 may be spatially reconfigurable, e.g. may include a plurality of portions (also referred to herein as parts, segments, pieces, or areas) that are movable with respect to one another. In the configuration shown in FIG. 1 the device 100 may include a first portion 102 and a second portion 104 that are movable with respect to one another. It is however understood that the device 100 may include more than two portions that may be movable with respect to one another, e.g. the device 100 may further include a third portion (e.g., movable with respect to the first portion 102 and/or with respect to the second portion 104), a fourth portion (e.g., movable with respect to the first portion 102 and/or with respect to the second portion 104 and/or with respect to the third portion), etc. The portions 102, 104 of the device 100 movable with respect to one another may be continuous portions or may include a plurality of (separated) sub-portions (see for example FIG. 3E) movable individually or together as a single portion.

Portions of the device 100 being movable with respect to one another may be understood as each portion being configured to be movable (e.g., around an axis, around a pivotal point, along a rail, etc.), such that the portions may move individually or together towards and away from one another, or may be understood as one portion being stationary (e.g., fixed, for example at a support structure, such as a pole, a tower, a wall, etc.) and the other portion(s) being movable towards and away from the fixed portion.

The portions of the device 100 that are movable with respect to one another may be parts of the device 100 that are inherently movable in view of the configuration (and the intended use) of the device 100. As examples, the portions 102, 104 may include a top cover and a bottom case of a laptop or tablet, or parts of a foldable screen or smartphone (e.g., two or more segments of a foldable screen or smartphone). Additionally or alternatively, the portions of the device 100 that are movable with respect to one another may be purposely configured to implement the strategy described herein (e.g., in the case that the device 100, for example a base station, does not inherently include movable portions).

The type of movement (also referred to herein as type of motion) of a portion of the device 100 (e.g., a movement of the first portion 102 and the second portion 104 with respect to one another) may be dependent on a desired configuration of the device 100. As an example, a movement of a portion 102, 104 of the device 100 may include a folding, a docking, a sliding, a rotation, and/or a swivel. A swivel may be provided, for example, in the case that the device 100 is or includes a base station, to provide sectorized transmission/reception capabilities, as described in further detail below (see for example FIG. 3E). The type of trajectory that a portion follows during its movement may be a function of the type of movement, e.g. a portion may follow a circular or at least partially circular trajectory (e.g., in case of folding or swiveling), a linear trajectory (e.g., in case of sliding), a non-linear trajectory (e.g., in case of motion along a rail with a non-linear shape), etc.

The portions of the device 100 (e.g., the first portion 102 and the second portion 104) may be connected with one another, e.g. via connecting elements that allow the relative movement of the portions of the device. As an example, the portions of the device 100 may be connected with one another via a hinge, a spring, a folding flap, or the like. Additionally or alternatively, the portions of the device 100 may be movable with respect to one another without being connected to one another, e.g. the portions of the device 100 (e.g., the first portion 102 and the second portion 104) may be movable along a respective rail, around a respective hinge, etc. The portions of the device 100 may be movable in one or more directions, depending on the configuration of the device 100. Illustratively, the portions of the device 100 may be movable in one-direction, in two-directions, or in three-directions, depending on the configuration of the device 100. A movement possible in (only) one-direction (e.g., a movement along a fixed, or constrained, trajectory, for example in the case of a top and bottom cover of a latpop) may provide a simpler alignment of the portions with one another, see also below in relation to FIG. 2A and FIG. 2B.

A movement of the portions of the device 100 (e.g., of the first portion 102 and the second portion 104) may be manually actuable (e.g., by a user, for example opening/closing a laptop, folding/unfolding a smartphone, etc.). Additionally or alternatively, the device 100 may include an actuation component (e.g., a motor, not shown) configured to actuate (e.g., to cause) a movement of the portions of the device 100 (e.g., of at least one of the first portion 102 and/or the second portion 104).

Described herein are antenna module placement (and orientation) schemes that provide different antenna array gains with respect to different spatial positions of the spatially reconfigurable device 100 (e.g., of a foldable UE). Various aspects may be based on the realization that a 5G device, whether it is a base station, a laptop, a tablet, or a smartphone, usually does not have areas that could accommodate large antenna arrays, but, on the other hand, the fine manufacturing technologies for slim and thin 5G devices make the placement of antenna array modules very accurate.

Below, e.g. with reference to FIG. 2A to FIG. 5B, are described methods and schemes of reconfigurable (e.g., 5G mmW) platforms and systems as well as the features of hardware (e.g., transceiver, MODEM baseband chips, and the like) that take advantage of the spatial movement of one part or one piece of a device (e.g., of the device 100) with respect to the other part (or parts) of the device. In the following are described: the placement of antenna array modules in spatially reconfigurable (e.g., 5G) devices; features in (e.g., 5G mmW) systems and hardware that support two or multiple modes of operation; and different spatial configurations of antenna array modules that result in coherent combination of (e.g., mmW) signals from modules to produce single or multiple antenna beams.

FIG. 2A, FIG. 2B, FIG. 2C, and FIG. 2D each exemplarily shows the device 100 including individual (in other words, single) antenna elements (FIG. 2A and FIG. 2C) and/or antenna arrays (FIG. 2B and FIG. 2D) disposed in the portions 102, 104 movable with respect to one another. In the following, the operations described in relation to a configuration with individual antenna elements may correspondingly apply to a configuration with antenna arrays, and vice versa. It is understood that the configuration of the device 100 illustrated in FIG. 2A to FIG. 2D may be simplified for the purpose of illustration, and the device 100 may include additional components with respect to those shown (e.g., one or more RF transceivers, a MODEM, etc.), see also FIG. 4.

Figure 2A:
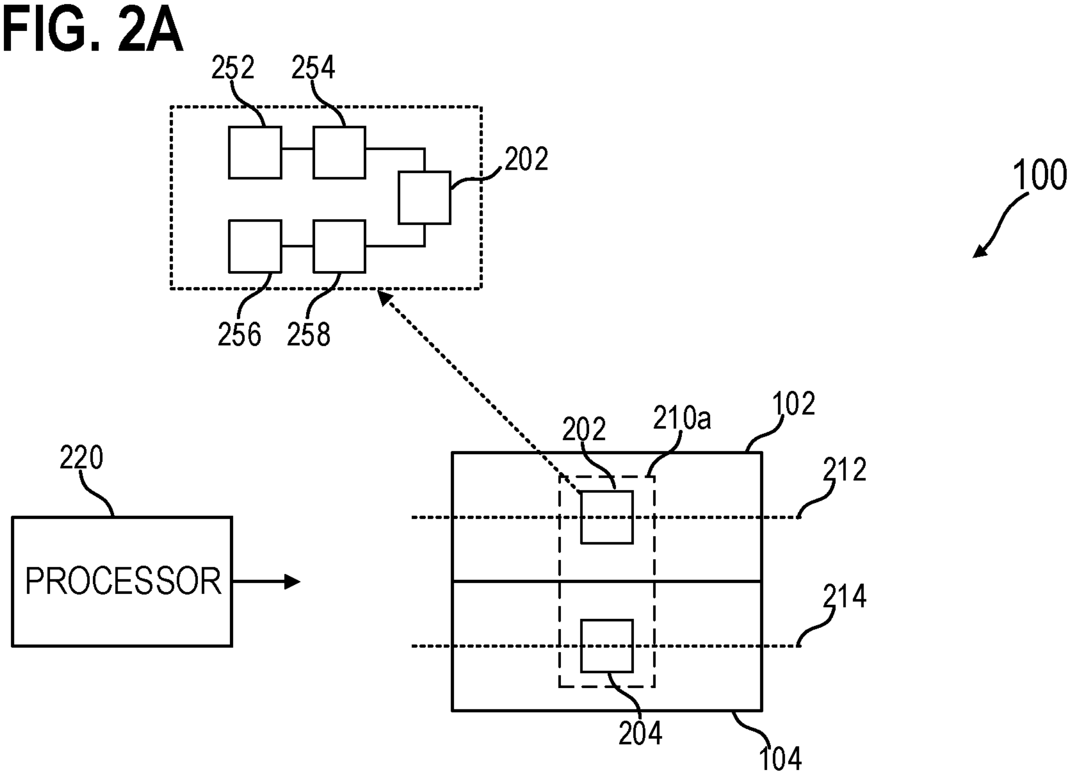
FIG. 2A, and FIG. 2C each exemplarily shows a device including a first antenna element and a second antenna element in a schematic view.
Figure 2B:
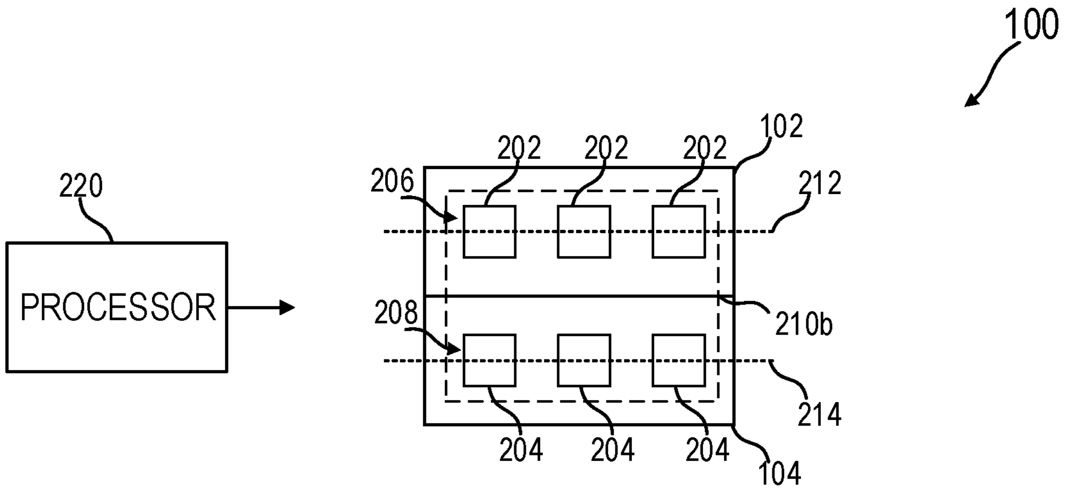
FIG. 2B, and FIG. 2D each exemplarily shows a device including a first antenna array and a second antenna array in a schematic view.
Figure 2C:
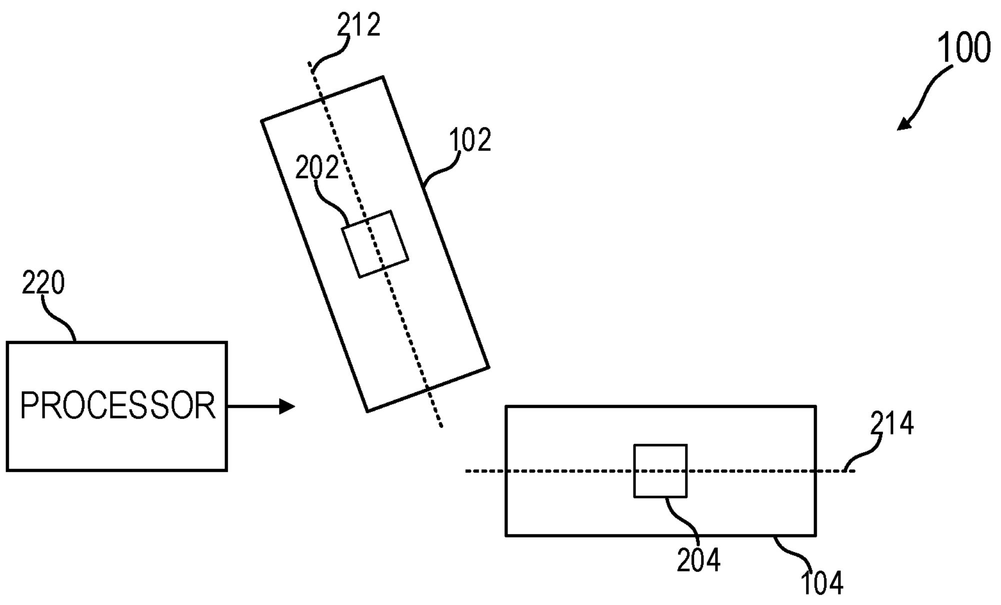
Figure 2D:
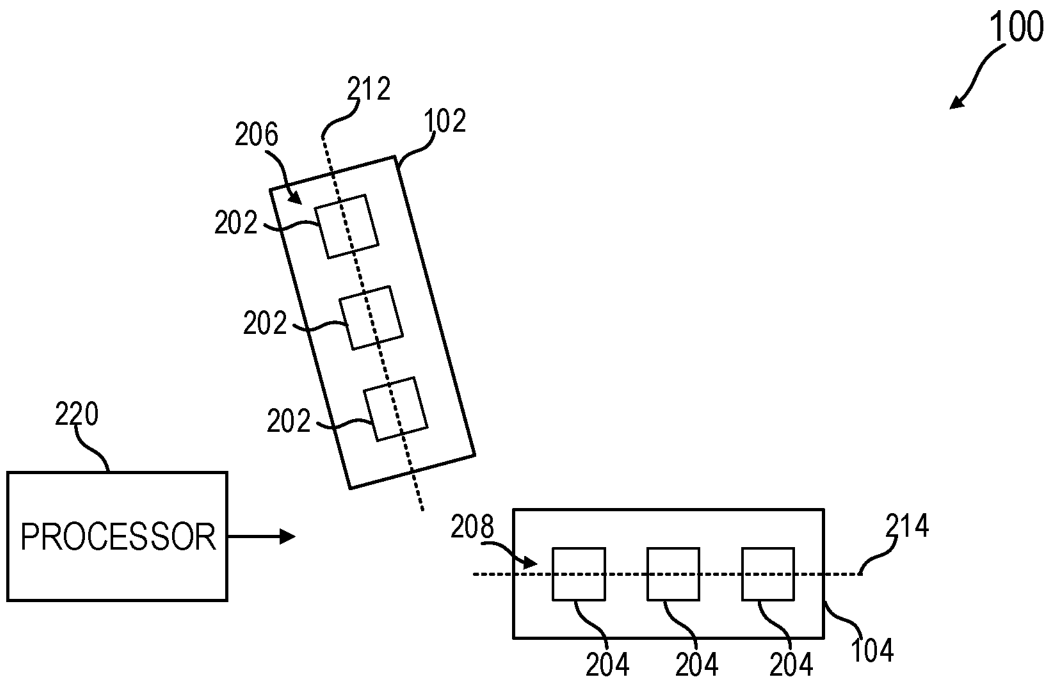

At least two portions of the device 100 that are movable with respect to one another (e.g., the first portion 102 and the second portion 104) may include a corresponding antenna element (see FIG. 2A and FIG. 2C) or a corresponding antenna array (see FIG. 2B and FIG. 2D). The arrangement of antenna elements or antenna arrays on portions of the device 100 that are movable with respect to one another allows providing a dynamically adaptable size of an antenna array, e.g. a dynamically adaptable transmission/reception configuration, as described in further detail below.

In the exemplary configuration in FIG. 2A and FIG. 2C, the first portion 102 may include a first antenna element 202, and the second portion 104 may include a second antenna element 204. In the exemplary configuration in FIG. 2B and FIG. 2D, the first portion 102 may include a first antenna array 206 (e.g., including a first plurality of (first) antenna elements 202), and the second portion 104 may include a second antenna array 208 (e.g., including a second plurality of (second) antenna elements 204). It is understood that further portions of the device 100 may include corresponding antenna elements or arrays, e.g. a third portion may include a third antenna element or a third antenna array, a fourth portion may include a fourth antenna element or a fourth antenna array, etc. It is also understood that the configurations shown in FIG. 2A to FIG. 2D may be combined with one another, e.g. the first antenna portion 102 may include a (single) first antenna element 202, and the second portion 104 may include a (second) antenna array 208, or vice versa.

The antenna elements of the device 100 (e.g., the first antenna element(s) 202, the second antenna element(s) 204, the third antenna element(s), etc.) may be configured (e.g., dimensioned) as a function of the radio frequency waves that the antenna elements may transmit and/or receive. As an example, the antenna elements of the device 100 may be configured to transmit and/or receive radio frequency waves having a wavelength in the range from 1 mm to 100 mm, for example in the range from 1 mm to 10 mm. The antenna elements of the device 100 may be configured to transmit and/or receive radio frequency waves having a frequency in the GHz range, e.g. in the range from 450 MHz to 6 GHz and/or from 24.25 GHz to 52.6 GHz. Illustratively, the antenna elements of the device 100 may be configured for 5G applications. It is however understood that these wavelength and frequency ranges are exemplary, and the antenna elements of the device 100 may be configured (e.g., dimensioned) to transmit and/or receive radio frequency waves having wavelength and frequency in different ranges (e.g., according to other types of technologies).

As an exemplary configuration at least one (or more than one, or each) antenna element (e.g., at least one of the first antenna element(s) 202 and/or the second antenna element(s) 204) may be configured as a phased antenna element. Illustratively, an antenna array (e.g., at least one of the first antenna array 206 and/or the second antenna array 208) may be configured as a phased antenna array.

The antenna arrays of the device 100 (e.g., the first antenna array 206 and the second antenna array 208) may be configured in accordance with the desired wavelength (or frequency) range of the radio frequency waves that the device 100 may transmit/receive. A periodicity of the antenna arrays may be configured as a multiple of the wavelength of the radio frequency waves that the device 100 may transmit/receive. As an example, a periodicity of an antenna array of the device 100 (e.g., a periodicity of the first antenna array 206 and/or a periodicity of the second antenna array 208) may be in the range from a quarter wavelength to a full wavelength, for example the periodicity may be a half wavelength. A periodicity of an antenna array may be understood as a distance (e.g., a center-to-center distance) between adjacent antenna elements of the array (e.g., a center-to-center distance along one direction in the case that the antenna array is a one-dimensional array, or a center-to-center distance along two directions in the case that the antenna array is a two-dimensional array). The antenna arrays of portions of the device 100 that are movable with respect to one another (e.g., the first antenna array 206 and the second antenna array 208) may have a same periodicity. The antenna arrays of the device 100 (e.g., the first antenna array 206 and the second antenna array 208) may be one-dimensional or two-dimensional arrays.

A number of antenna elements of an antenna array of the device 100 may be dependent on a desired operation and/or on a configuration of the device 100 (e.g., on an overall dimension of the device 100, on an overall power consumption, etc.). As a numerical example, a number of antenna elements of an antenna array of the device 100 (e.g., a number of antenna elements 202 of the first antenna array 206 and/or a number of antenna elements 204 of the second antenna array 208) may be in the range from 2 to 256, for example in the range from 4 to 8, for example in the range from 16 to 64.

As an exemplary configuration, the antenna elements 202, 204 (and the antenna arrays 206, 208) of the device 100 may be configured as active antenna elements 202, 204 (or active antenna arrays 206, 208). As shown in the inset 250 in FIG. 2A, an antenna element of the device 100 may have (e.g., may be connected to) a corresponding phase shifter 252 and a corresponding low-noise amplifier 254 for receiving radio frequency waves. Additionally or alternatively, an antenna element of the device 100 may have a corresponding phase shifter 256 and a corresponding power amplifier 258 for transmitting radio frequency waves. It is understood that the configuration shown in the inset 250 in relation to the first antenna element 202 may apply correspondingly to each active antenna element of the device 100.

As another exemplary configuration, additionally or alternatively, the antenna elements 202, 204 (and the antenna arrays 206, 208) of the device 100 may be configured as passive antenna elements 202, 204 (or passive antenna arrays 206, 208). Illustratively, a passive antenna element may not have the corresponding components for active transmission/reception of radio frequency waves (e.g., the phase shifter 252, 256, the low noise amplifier 254, the power amplifier 258), and may be configured to operate parasitically.

It is understood that the configuration as active or passive antenna elements/arrays may also be combined with one another. As an example, a first set of the antenna elements/arrays of the device 100 may be configured as active antenna elements/arrays, and a second set of the antenna elements/arrays of the device 100 may be configured as passive antenna elements/arrays.

The antenna elements 202, 204 and/or antenna arrays 206, 208 of portions 102, 104 of the device 100 that are movable with respect to one another may be configured (e.g., arranged) to provide different modes of operation depending on the relative position of the respective portion 102, 104 with one another. Illustratively, as a function of the spatial relationship between the portions 102, 104 of the device 100, the respective antenna elements 204, 204 or antenna arrays 206, 208 may operate together (e.g., may form a combined (larger) antenna, e.g., a combined antenna array 210*a*, 210*b* see FIG. 2A and FIG. 2B) or may operate independently (e.g., may form individual (smaller) antennas, see FIG. 2C and FIG. 2D, e.g. individual smaller antenna arrays). The configuration described herein provides thus an adaptable configuration of an antenna array 210*a*, 210*b*, e.g. moving the portions 102, 104 of the device 100 may vary the size (the number of antenna elements 202, 204) of the (combined) antenna array 210*a*, 210*b* and/or may vary the direction in which the antenna elements 202, 204 transmit/receive.

The present disclosure may be based on the realization that providing an alignment between antenna elements/arrays disposed in different (movable) portions of a device such that in at least one relative position (e.g., the first position in FIG. 2A and FIG. 2B) the antenna elements/arrays may operate together may provide an improved operation of the device, e.g. a higher gain and a more tunable configuration, as described in further detail below. In a conventional device, on the other hand, even in the case that antenna elements/arrays are disposed in different portions of the device, there is no alignment and orientation to provide a combined operation of the antenna elements/arrays (e.g., to provide a combined antenna array). Illustratively, in a conventional device, which may include a plurality of antenna elements/arrays (e.g., for antenna diversity purposes), the antenna elements/arrays operate independently of one another irrespective of the relative position between the respective portions.

With reference to the exemplary configuration in FIG. 2A, the first antenna element 202 and the second antenna element 204 may be configured (e.g., arranged, e.g. oriented) such that in a first relative position of the first portion 102 and the second portion 104 with respect to one another the first antenna element 202 and the second antenna element 204 operate in combination with one another. With reference to the exemplary configuration in FIG. 2B, the first antenna array 206 and the second antenna array 208 are configured (e.g., arranged, e.g. oriented) such that in the first relative position of the first portion 102 and the second portion 104 with respect to one another the first antenna array 206 and the second antenna array 208 operate in combination with one another. Illustratively, in the first relative position of the first portion 102 and the second portion 104 with respect to one another, the first antenna element 202 and the second antenna element 204 and/or the first antenna array 206 and the second antenna array 208 may form the combined antenna array 210*a*, 210*b*. The combined antenna array 210*a*, 210*b* may be a one-dimensional or a two-dimensional array, depending on the arrangement of the first antenna element(s) 202 and the second antenna element(s) 204. As an exemplary configuration, the combined antenna array 210*b* may have substantially the same periodicity as the first antenna array 206 and the second antenna array 208.

In the first relative position of the first portion 102 and the second portion 104 with respect to one another, the first antenna element(s) 202 and the second antenna element(s) 204 may be aligned with one another (and oriented into a same plane), providing the combined antenna array 210*a*, 210*b*. The first antenna element(s) 202 and the second antenna element(s) 204 may be aligned with one another along at least one direction (e.g., one of a vertical direction or a horizontal direction), e.g. along two directions in the case that the first antenna array 206 and the second antenna array 208 are two-dimensional arrays.

The first relative position of the first portion 102 and the second portion 104 with respect to one another may include a position such that a first radiation pattern corresponding to the first antenna element 202 (or to the first antenna array 206) and a second radiation pattern corresponding to the second antenna element 204 (or to the second antenna array 208) point towards a same direction. Illustratively, in the first relative position of the first portion 102 and the second portion 104 with respect to one another, the first antenna element(s) 202 and the second antenna element(s) 204 may be (re-)oriented into a same plane.

In the first relative position, the first radiation pattern of the first antenna element/array and the second radiation pattern of the second radiation pattern of the second antenna element/array may form a combined radiation pattern, as discussed in further detail below. As another example, in the first relative position the first radiation pattern of the first antenna element/array and the second radiation pattern of the second antenna element/array may be separate (individual) radiation patterns in a same plane (illustratively, the first radiation pattern and the second radiation pattern may originate from a same source, e.g., from a same plane, e.g. from the combined antenna array 210*a*, 210*b*), see also FIG. 3E. The configuration in the first relative position of the first portion 102 and the second portion 104 with respect to one another may thus provide implementing beamforming towards a desired direction via the combination of the respective radiation patterns of the first antenna element(s) and the second antenna element(s), and/or may provide orienting separate radiation patterns in a same plane, e.g. to reach base stations or users located overall along a same direction but in separate locations. This configuration may allow generating more independent beams, and/or providing higher gain beams for a smaller number of beams.

The (larger) combined antenna array 210*a*, 210*b* may increase the degrees of freedom to create multiple beams (e.g., in view of the array factor). Illustratively, the ability of controlling the size of the (combined) antenna array 210*a*, 210*b* provides flexibility in the type of beams that the array may create. The increased number of antenna elements 202, 204 of the (e.g., phased) combined array as a whole provides an increased flexbility for the generation of multiple independent beams (see also FIG. 3E). An individual (e.g., phased) antenna array 206, 208 may be capable of supporting the multiple beams, and the combination (e.g., the alignment) of the individual antenna arrays to provide the combined antenan array may provide supporting an even greater number of beam configurations.

With reference to the exemplary configuration in FIG. 2C, the first antenna element 202 and the second antenna element 204 may be configured (e.g., arranged, e.g. oriented) such that in a second relative position of the first portion 102 and the second portion 104 with respect to one another the first antenna element 202 and the second antenna element 204 operate independently of one another. With reference to the exemplary configuration in FIG. 2D, the first antenna array 206 and the second antenna array 208 may be configured (e.g., arranged, e.g. oriented) such that in the second relative position of the first portion 102 and the second portion 104 with respect to one another the first antenna array 206 and the second antenna array 208 operate independently of one another. Illustratively, in the second relative position of the first portion 102 and the second portion 104 with respect to one another, the first antenna element 202 and the second antenna element 204 and/or the first antenna array 206 and the second antenna array 208 may operate as (switched) diversity antennas with respect to one another (e.g., may operate at separate times). In a conventional device, the antenna elements/arrays may operate as diversity antennas irrespective of their relative position. In the approach described herein, the re-orienting of the antenna elements/arrays (illustratively, the re-orienting of the portions of the device 100) is exploited to adapt the transmission/reception configuration, thus increasing the capabilities of the device.

In the second relative position of the first portion 102 and the second portion 104 with respect to one another the first radiation pattern corresponding to the first antenna element/array and the second radiation pattern corresponding to the second antenna element/array may point towards different directions. Illustratively, in the second relative position the first radiation pattern of the first antenna element/array and the second radiation pattern of the second radiation pattern of the second antenna element/array may be separate (individual) radiation patterns in different planes (illustratively, in azimuth planes not parallel to one another and/or elevation planes not parallel to one another). The first radiation pattern and the second radiation pattern may originate from different planes (illustratively, the different antenna elements/arrays spatially separated from one another).

It is understood that the modes of operation may be more than two, e.g. there may be more than two possible relative positions of the first portion 102 and the second portion 104 with respect to one another. Depending on the relative position (e.g., the first or second described above, or a third, fourth, etc.) the antenna elements 202, 204 may provide radiation patterns pointing towards different directions and/or in a different relationship between one another.

In the exemplary configurations in FIG. 2A to FIG. 2D, the illustrated orientation and the arrangement of the portions 102, 104 in first relative position and the second relative position are exemplarily and it is understood that the orientation and the arrangement of the portions 102, 104 in the first relative position and the second relative position may vary with respect to those shown, as long as it is ensured that the antenna elements 202, 204 in one position operate independently of one another (e.g., form separate smaller antennas) and the antenna elements 202, 204 in another position operate in combination with one another (e.g., form a combined larger antenna).

As an example, the first relative position of the portions 102, 104 with respect to one another may include a first axis 212 corresponding to the first portion 102 and a second axis 214 corresponding to the second portion 104 being parallel to one another. The first axis 212 and the second axis 214 may be oriented along a main dimension (e.g., a length, or a width, as examples) of the respective portion 102, 104 (e.g., may illustratively pass through the center of the respective portion 102, 104 along one of the horizontal or vertical direction). In an exemplary configuration, the first relative position of the first portion 102 and the second portion 104 with respect to one another may include a position in which a (e.g., center-to-center) distance between at least one first antenna element 202 and at least one second antenna element 204 is in the range from a quarter wavelength to a full wavelength (considering the wavelength that the antenna elements 202, 204 may transmit/receive). In an exemplary configuration (see also FIG. 3E), in the case that the first portion 102 and the second portion 104 include a respective plurality of sub-portions (each sub-portion including a respective antenna sub-array), in the first relative position the first portion 102 and the second portion 104 may be interleaved with one another. Illustratively, a spacing along one direction (e.g., the vertical direction) of a plurality of first sub-portions of the first portion 102 and of a plurality of second sub-portions of the second portion 104 may be configured such that in the first relative position of the first portion 102 and the second portion 104 with respect to one another the plurality of first sub-portions and the plurality of second sub-portions are interleaved with one another.

As another example, the second relative position of the portions 102, 104 with respect to one another may include the first axis 212 corresponding to the first portion 102 and the second axis 214 corresponding to the second portion 104 being at an angle with one another (e.g., an angle greater than 0° and less than 180°), e.g. an angle greater than 45°, for example greater than 60°, for example an angle of 90° (e.g., the portions 102, 104 may be perpendicular to each other) or greater than 90°.

Varying the relative position of the portions 102, 104 of the device 100 may provide adapting the gain (and the antenna aperture) in a dynamic manner. The combined antenna array 210*a*, 210*b* may have a gain (and an antenna aperture) greater than the individual gain/antenna aperture of the individual antenna elements 202, 204 or individual antenna arrays 206, 208. Illustratively, in the second relative position of the first portion 102 and the second portion 104 with respect to one another the first antenna element(s) 202 (the first antenna array 206) may have a first gain (a first antenna aperture) and the second antenna element(s) 204 (the second antenna array 208) may have a second gain (a second antenna aperture), and in the first relative position of the first portion 102 and the second portion 104 with respect to one another the combined antenna array 210*a*, 210*b* may have a (third) gain greater than the first gain and greater than the second gain (and a (third) antenna aperture greater than the first antenna aperture and greater than the second antenna aperture).

It is understood that the operations described in relation to the first and second relative position of the first and second portion 102, 104 of the device 100 may correspondingly apply to further antenna elements/antenna arrays disposed in other movable portions of the device. As an example, in the case that a third portion includes third antenna element(s) (e.g., a third antenna array), the first antenna element(s) 202 and the third antenna element(s) may be arranged such that in a third relative position of the first portion 102 and the third portion with respect to one another the first antenna element(s) 202 and the third antenna element(s) operate in combination with one another (e.g., form a combined antenna array), and in a fourth relative position of the first portion 102 and the third portion with respect to one another the first antenna element(s) 202 and the third antenna element(s) operate independently of one another (e.g., form separate antennas). As a further example, additionally or alternatively, the second antenna element(s) 204 and the third antenna element(s) may be arranged such that in a fifth relative position of the second portion 104 and the third portion with respect to one another the second antenna element(s) 204 and the third antenna element(s) operate in combination with one another, and in a sixth relative position of the second portion 104 and the third portion with respect to one another the second antenna element(s) 204 and the third antenna element(s) operate independently of one another. The operations may correspondingly apply to fourth antenna element(s) of a fourth portion, fifth antenna element(s) of a fifth portion, etc. For example, the size of the combined antenna array 210*a*, 210*b* may be further adapted (e.g., further increased) by aligning a third portion with respect to the first and second portions 102, 104.

The device 100 may include alignment elements (not shown) configured to indicate an alignment of the portions that are movable with respect to one another, e.g. the device 100 may include at least one alignment element configured to indicate an alignment of the first portion 102 with respect to the second portion 104. An alignment element may be understood as an optical and/or mechanical aid to ensure that the portions are aligned with one another in a way that provides the desired configuration of the respective antenna elements (e.g., in a way that provides forming the desired combined antenna array 210*a*, 210*b*). An alignment element may include, for example, a small mechanical feature for docking or folding accuracy.

In an exemplary configuration, the first portion 102 may be corresponding to (e.g., may include) a first alignment element, the second portion 104 may be corresponding to (e.g., may include) a second alignment element, and the first alignment element and the second alignment element may be configured to engage with one another in the case that the first portion 102 and the second portion 104 are in the first relative position with respect to one another. As examples, the first portion 102 may include a magnet that interacts with a magnet of the second portion 104, or the first portion 102 may include a hook-shaped element that engages with a correspondingly shaped hole of the second portion 104, or the like.

The device 100 may include a processor 220 configured to control a transmission/reception of radio frequency waves at the antenna elements 202, 204 of the device 100. The processor 220 may be configured to control a behavior of the first and second antenna elements 202, 204 (e.g., of the first and second antenna arrays 206, 208) as a function of the state of the device, e.g. as a function of the relative position of the portions 102, 104 of the device 100 with respect to one another. The processor 220 may be configured to provide a control signal (e.g., a feed signal, for example a voltage) at the antenna elements/arrays to control the respective behavior, as described in further detail below. The processor 220 may further be configured to process a radio frequency signal that the antenna elements/arrays transmit (or should transmit) and/or a radio frequency signal that the antenna elements/arrays receive, as described in further detail below.

The processor 220 may be configured to adapt a beamforming configuration as a function of the relative position of the movable portions 102, 104 of the device 100 with respect to one another, e.g. as a function of the relative position of the antenna elements 202, 204 (e.g., of the antenna arrays 206, 208) with respect to one another. Illustratively, the processor 220 may be configured to adapt a beamforming configuration as a function of the (current) configuration of the combined antenna array.

With reference to the exemplary configuration in FIG. 2A to FIG. 2D, the processor 220 may be configured to provide a first beamforming configuration in the case that the first antenna element(s) 202 (e.g., the first antenna array 206) and the second antenna element(s) 204 (e.g., the second antenna array 208) are in the first relative position with respect to one another in which the first antenna element(s) 202 and the second antenna element(s) 204 operate in combination with one another, and to provide a second beamforming configuration in the case that the first antenna element(s) 202 and the second antenna element(s) 204 are in the second relative position with respect to one another in which the first antenna element(s) 202 and the second antenna element(s) 204 operate independently of one another. Stated in a different fashion, the processor 220 may be configured to provide the first beamforming configuration in the case that the first portion 102 and the second portion 104 are in the first relative position with respect to one another (with the antenna elements/arrays aligned), and may be configured to provide the second beamforming configuration in the case that the first portion 102 and the second portion 104 are in the second relative position with respect to one another (with the antenna elements/arrays separate). It is understood that the processor 220 may be configured to provide further beamforming configurations (e.g., a third beamforming configuration, a fourth beamforming configuration, etc.) as a function of the number of movable portions and/or as a function of the number of possible relative positions.

The first beamforming configuration may include a coherent combination of the first radiation pattern corresponding to the first antenna element 202 (e.g., corresponding to the first antenna array 206) and of the second radiation pattern corresponding to the second antenna element 204 (e.g., corresponding to the second antenna array 208) to provide the combined radiation pattern (illustratively, the combined antenna array may have a (third) radiation pattern provided by the first antenna element/array and the second antenna element/array). As another example, additionally or alternatively, the first beamforming configuration may include the first radiation pattern and the second radiation pattern being separate and in a same plane (e.g., originating from a same plane and pointing towards different direction), to allow the device 100 to point at two different locations (e.g., two base stations or users), which may not be possible in the case that the portions 102, 104 are oriented at an angle (e.g., 90°) with one another due to limited beam sweep angle, see also FIG. 3E. The transmission of multiple beams in different directions via the combined antenna array may include coherent beamforming of the individual arrays together.

The second beamforming configuration may include a spatial separation of the first radiation pattern corresponding to the first antenna element 202 (e.g., corresponding to the first antenna array 206) and of the second radiation pattern corresponding to the second antenna element 204 (e.g., corresponding to the second antenna array 208) in separate planes, e.g. the first radiation pattern and the second radiation pattern may point towards different directions (e.g., towards directions perpendicular to one another, for example). The first radiation pattern and the second radiation pattern may originate from different planes and be directed in different directions (e.g., directions at an angle with one another). The spatial separation of the first radiation pattern and of the second radiation pattern may include the first radiation pattern having a first azimuth plane and a first elevation plane, and the second radiation pattern having a second azimuth plane and a second elevation plane. The first azimuth plane and the second azimuth plane may be not parallel to one another, and/or the first elevation plane and the second elevation plane may be not parallel to one another.

As an exemplary configuration, the control of the beamforming configuration of the antenna elements 202, 204 may include controlling corresponding phase shifters coupled with the antenna elements 202, 204, as known in the art (e.g., the phase shifters 252, 256 shown in the inset 250 in FIG. 2A). For example, the first antenna elements 202 may be corresponding to first phase shifters (e.g., each first antenna element 202 may be corresponding to a respective first phase shifter), and the second antenna elements 204 may be corresponding to second phase shifters (e.g., each second antenna element 204 may be corresponding to a respective second phase shifter). The first beamforming configuration may include the processor 220 being configured to control the first phase shifter(s) and the second phase shifter(s) to provide a phase alignment between the first radiation pattern and the second radiation pattern. Illustratively, the first beamforming configuration may include the processor 220 being configured to control the first phase shifter(s) to provide respective first phase shift(s) and the second phase shifter(s) to provide respective second phase shift(s) to provide a phase alignment between a first RF signal that the first antenna element(s) 202 (e.g., the first antenna array 206) receive and a second RF signal that the second antenna element(s) 204 (e.g., the second antenna array 208) receive, e.g. in the case that the first antenna element(s) 202 and second antenna element(s) 204 operate as receiving antennas. Additionally or alternatively, the first beamforming configuration may include the processor 220 being configured to control the first phase shifter(s) to provide respective first phase shift(s) and the second phase shifter(s) to provide respective second phase shift(s) to provide a phase alignment between a first RF signal that the first antenna element(s) 202 (e.g., the first antenna array 206) transmit and a second RF signal that the second antenna element(s) 204 (e.g., the second antenna array 208) transmit, e.g. in the case that the first antenna element(s) 202 and second antenna element(s) 204 operate as transmitting antennas.

As another exemplary configuration, the processor 220 may be configured to implement beamforming in a digital manner. Additionally or alternatively to analog beamforming via the control of respective phase shifters, the processor 220 may be configured to provide respective control signals (e.g., feed signals) at the antenna element(s) 202, 204. The control signals may be adapted in the digital domain to control the transmission/reception of RF signals at the antenna element(s) 202, 204 according to the desired beamforming. In this configuration, the antenna element(s) 202, 204 may have (e.g., may be coupled to) corresponding elements for processing the digital control signal, e.g. an analog-to-digital converter, a RF translator, and the like.

In the case that the first antenna element(s) 202 and the second antenna element(s) 204 form the combined antenna array 210*a*, 210*b*, the processor 220 may be configured to coherently combine the first RF signal that the first antenna element(s) 202 (e.g., the first antenna array 206) receive/transmit and the second RF signal that the second antenna element(s) 204 (e.g., the second antenna array 208) receive/transmit, with one another.

The combination of the first RF signal that the first antenna element(s) 202 receive/transmit and the second RF signal that the first antenna element(s) 204 receive/transmit may provide correcting a misalignment between the antenna elements 202, 204 (illustratively, a misalignment in the combined antenna array 210*a*, 210*b*). The coherent combination of the first RF signal and the second RF signal with one another may include a correction of a misalignment between the first antenna element(s) 202 and the second antenna element(s) 204, e.g. a correction of a difference between the periodicity of the combined antenna array 210*b* and the periodicity of the first and second antenna arrays 206, 208. The correction may provide the desired operation taking into account manufacturing tolerances (e.g., known, or determined during or after production).

In an exemplary configuration, additionally or alternatively, the processor 220 may be configured to retrieve the beamforming configuration to apply from a memory of the device 100. The device 100 (and/or the processor 220) may include a memory storing a table (e.g., a look-up table) mapping a beamforming configuration with a respective relative position of the movable portions of the device 100 with respect to one another (e.g., a respective relative position of the first portion 102 and the second portion 104 with respect to one another). The table may include a mapping of first phase shift(s) that the first phase shifter(s) provide and/or second phase shift(s) that the second phase shifter(s) provide with a respective relative position of the first portion 102 and the second portion 104 with respect to one another. As another example, the table may include a mapping of digital control signals with a respective relative position of the first portion 102 and the second portion 104 with respect to one another. The memory may provide updating the beamforming configurations to apply, e.g. to implement additional or alternatives operation modes.

Additionally or alternatively to the configuration described above, the processor 220 may be configured to instruct (e.g., to cause) a relative movement of the movable portions of the device 100 (e.g., of the first portion 102 and the second portion 104 with respect to one another). The processor 220 may be configured to control an actuation component (e.g., a motor) of the device 100 to move the first portion 102 and the second portion 104 with respect to one another. The processor 220 may be configured to instruct the relative movement of the movable portions to select a transmission/reception configuration, e.g. as a function of a desired operation. Illustratively, the processor 220 may be configured to instruct the relative movement of the first portion 102 and the second portion 104 with respect to one another to bring the first portion 102 and the second portion 104 in the first relative position or in the second relative position as a function of a current (or desired) transmission/reception scenario of the device 100. Further illustratively, depending on a desired transmission/reception direction, the processor 220 may be configured to move the portions 102, 104 to operate as diversity antennas or as a combined antenna array.

Additionally or alternatively to the configuration described above, the spatially reconfigurable concept is extensible to passive array enhancement, without requiring the coherent combination in the processor 220 (e.g., in a transceiver chip or baseband chip with digital beamforming), e.g. without requiring a coherent combiner. The (e.g., inherent or intentional) spatial movement, with appropriate design and analysis, may provide creating parasitic excitation of dummy elements for increased gain in some orientations; and/or may provide increasing gain/beam steering due to "reflector effect" utilizing a ground plane in some orientations.

As an example, in the case the antenna element(s) 202, 204 form the combined antenna array 210*a*, 210*b* (e.g., in the first relative position of the first portion 102 and the second portion 104 with respect to one another), at least one antenna element may behave as a passive antenna (or may be configured as a passive antenna element, as described above), e.g. may be configured not to transmit/receive a RF signal (illustratively, the processor 220 may be configured not to activate such passive antenna). Illustratively, the first antenna element 202 (e.g., at least one first antenna element 202 of the first antenna array 206) or the second antenna element 204 (e.g., at least one second antenna element 204 of the second antenna array 208) may behave as a passive antenna. This configuration may provide enhancing the transmission/reception (of the other antenna element(s)) with a reduced power consumption.

As an additional or alternative configuration (e.g., in addition or in alternative to including the respective antenna elements or arrays), a portion of the device 100 (e.g., at least one of, or each of, the first portion 102 and/or the second portion 104) may include one or more dummy elements and/or one or more reflective elements. The one or more dummy elements may be configured to enhance radiation via parasitic excitation. The one or more reflective elements may be configured to modify and/or redirect the radiation pattern in a predetermined fashion. Illustratively, the one or more dummy elements and/or the one or more reflective elements may be configured (e.g., arranged) such that in the case that the first portion 102 and the second portion 104 are in the first relative position with respect to one another, the one or more dummy elements and/or the one or more reflective elements of the first portion 102 enhance/modify the radiation pattern of the antenna element(s) 204 of the second portion 104, and/or vice versa.

FIG. 3A, FIG. 3B, FIG. 3C, FIG. 3D, and FIG. 3E each exemplarily shows a respective device 300*a*, 300*b*, 300*c*, 300*d*, 300*e* in a schematic view. The devices 300*a*, 300*b*, 300*c*, 300*d*, 300*e* may be an exemplary configuration of the device 100 described in relation to FIG. 1 to FIG. 2A. The devices 300*a*, 300*b*, 300*c*, 300*d*, 300*e* may include portions that are movable with respect to one another, e.g. a respective first portion 302*a*, 302*b*, 302*c*, 302*d*, 302*e* (including a first antenna array 306*a*, 306*b*, 306*c*, 306*d*, 306*e*) and a respective second portion 304*a*, 304*b*, 304*c*, 304*d*, 304*e* (including a second antenna array 308*a*, 308*b*, 308*c*, 308*d*, 308*e*) that are movable with respect to one another. In a first relative position of the first portion 302*a*, 302*b*, 302*c*, 302*d*, 302*e* and the second portion 304*a*, 304*b*, 304*c*, 304*d*, 304*e* with respect to one another the first antenna array 306*a*, 306*b*, 306*c*, 306*d*, 306*e* may have a first radiation pattern 310*a*, 310*b*, 310*d*, 310*e*, and the second antenna array 308*a*, 308*b*, 308*c*, 308*d*, 308*e* may have a second radiation pattern 312*a*, 312*b*, 312*d*, 312*e* that are separate from one another (not shown in FIG. 3C). In a second relative position of the first portion 302*a*, 302*b*, 302*c*, 302*d*, 302*e* and the second portion 304*a*, 304*b*, 304*c*, 304*d*, 304*e* with respect to one another the first antenna array 306*a*, 306*b*, 306*c*, 306*d*, 306*e* and the second antenna array 308*a*, 308*b*, 308*c*, 308*d*, 308*e* may provide a combined radiation pattern 314*a*, 314*b*, 314*d*, 314*e* (illustratively, a radiation pattern of the combined antenna array). The radiation patterns 314*a*, 314*b*, 314*d*, 314*e* are shown as having a main lobe and one or more side lobes. It is understood that the configuration of the radiation patterns 314*a*, 314*b*, 314*d*, 314*e* in FIG. 3A to FIG. 3E is exemplary, and other radiation patterns (e.g., with different shapes, with more or less lobes, pointing in different directions, etc.) may be provided.

Figure 3A:
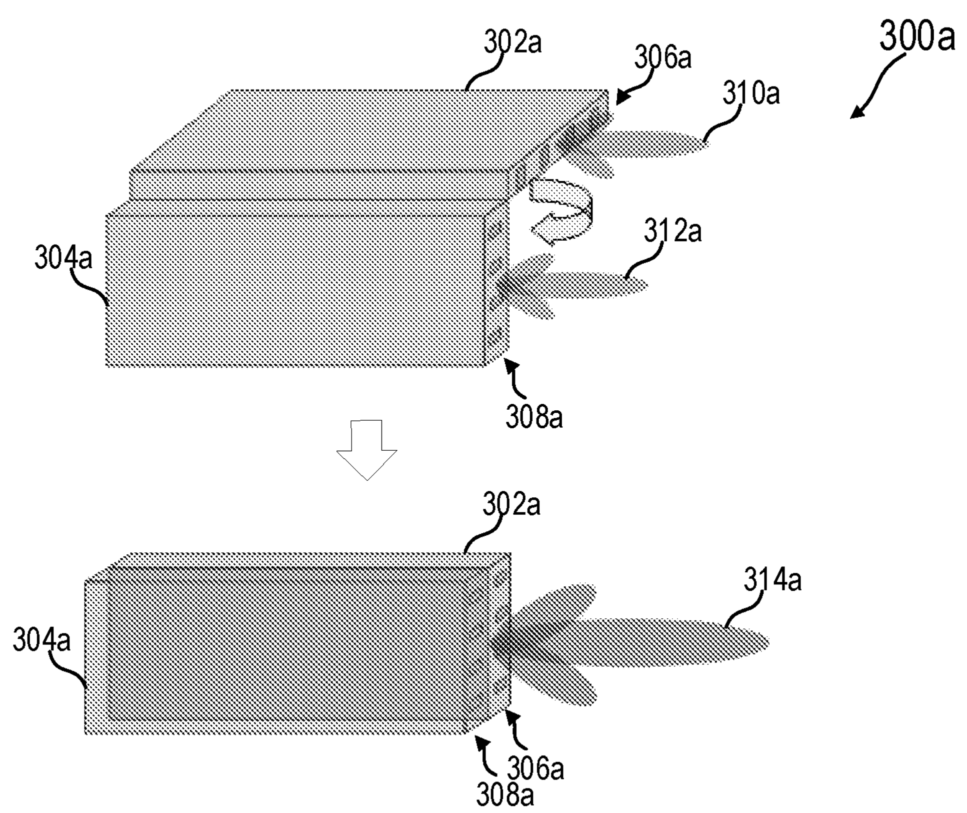
FIG. 3A, FIG. 3B, FIG. 3C, FIG. 3D, and FIG. 3E each exemplarily shows a device including a first antenna array and a second antenna array in a schematic view.

FIG. 3A illustrates, as an example, two antenna array modules 306*a*, 308*a* (two 1×4 arrays) placed on the side edges 302*a*, 304*a* of a foldable UE device 300*a*, e.g. a laptop. In the case that the laptop 300*a* is in an un-folded position (top), the two arrays 306*a*, 308*a* act as switched diversity antennas with respect to each other (illustratively, only one of the 1×4 arrays 306*a*, 308*a* is active at a time). The mmW antenna array gain may be 20*log(4), 12 dB for each array 306*a*, 308*a*. In the case that the laptop 300*a* is in the folded position (bottom), the two arrays 306*a*, 308*a* may be coherently combined into one (combined) 2×4 array with gain of 20*log(8)=18 dB, which is 6 dB higher.

Figure 3B:
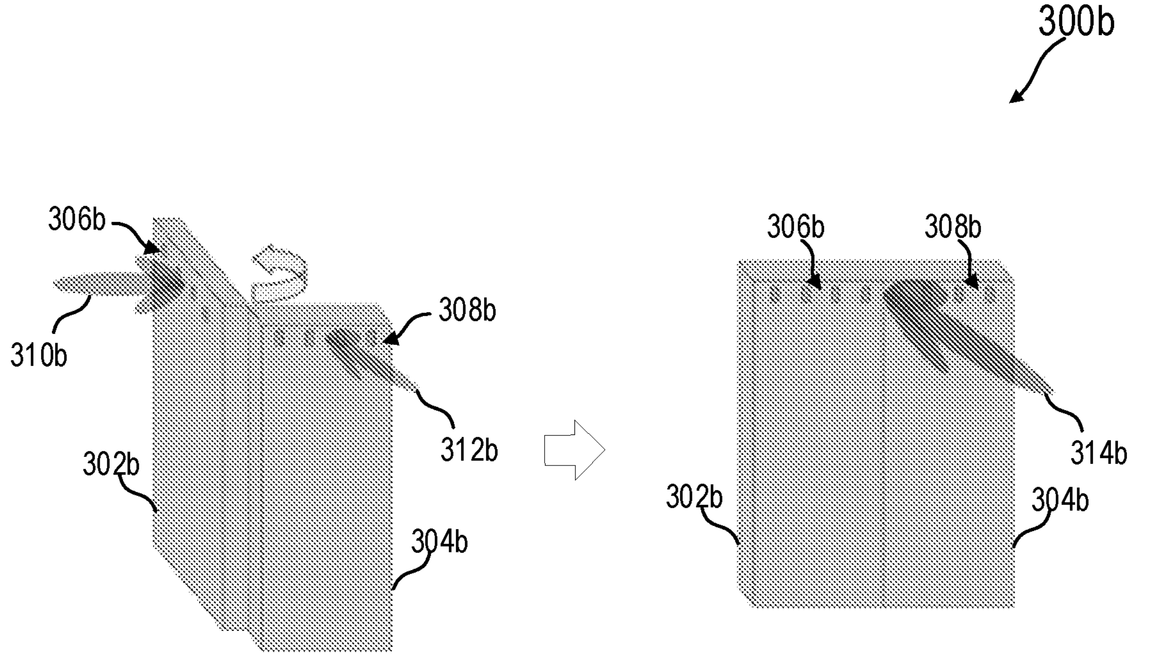

FIG. 3B illustrates, as another example, a dual-screen device 300*b*, including two 1×4 antenna arrays 306*b*, 308*b* acting as diversity arrays in a semi-open position (left), which may be reconfigured so that the antenna arrays 306*b*, 308*b* coherently combine to form a 1×8 array (providing a narrower beam in one plane) in the case that the device 300*b* is in a fully open position (right). Illustratively, in the semi-open position the antenna arrays 306*b*, 308*b* may operate as switched diversity antennas pointing in different directions, and in the fully-open position the antenna arrays 306*b*, 308*b* may provide a coherent combination forming a high-gain 1×8 array. This may be a natural requirement that may be satisfied in the case that the device 300*b* requires high data rate consumption in the fully-open mode.

Figure 3C:
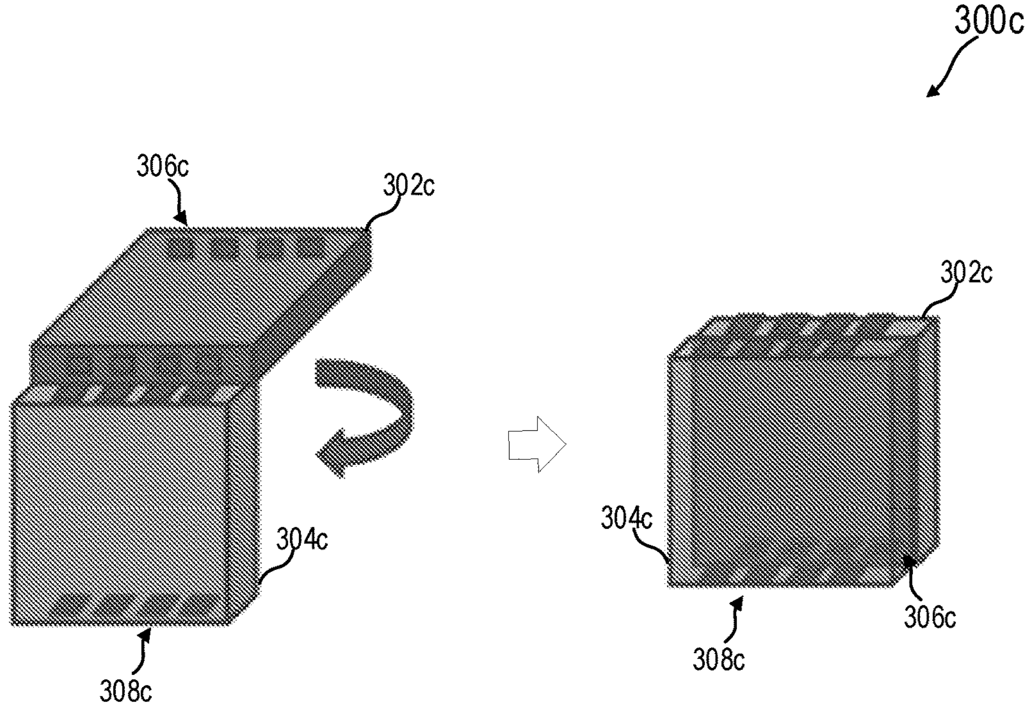
Figure 3D:
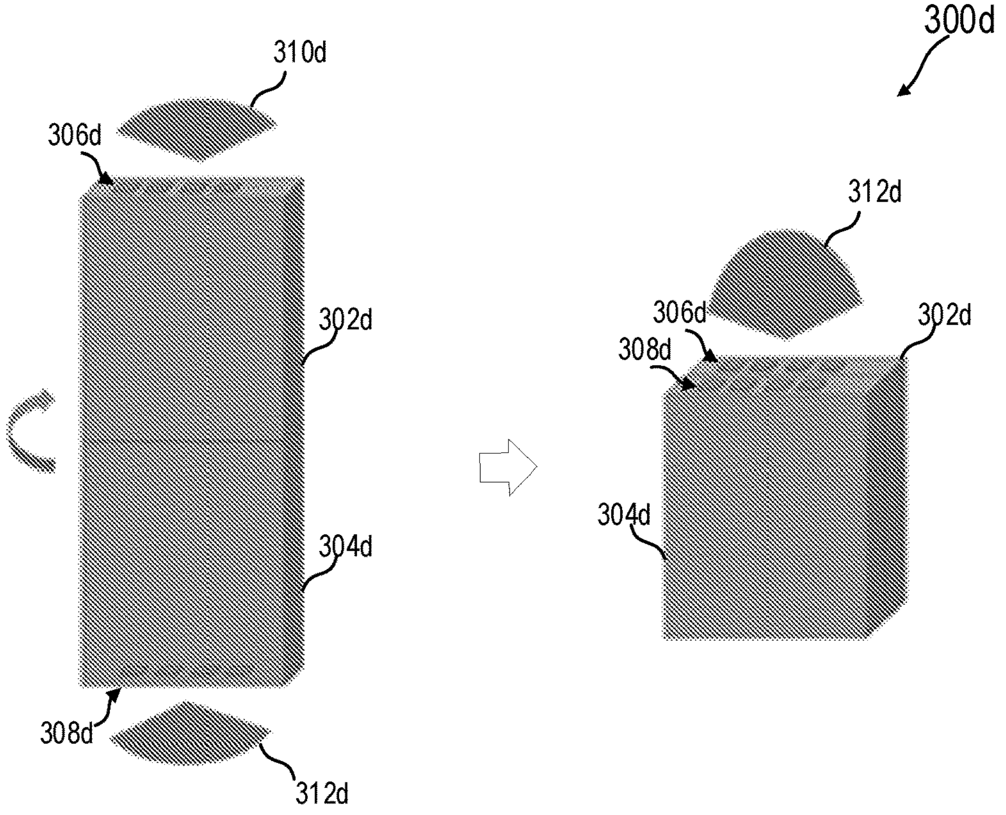

FIG. 3C and FIG. 3D illustrate, as another example, a 5G device 300*c*, 300*d* with mmW antenna modules 306*c*, 306*d*, 308*c*, 308*d* placed at the top edge and middle (folding position). The device 300*c*, 300*d* may be, for example, a laptop or a smartphone (e.g., a short flip phone). Depending on the form factor, the antenna array modules 306*c*, 306*d*, 308*c*, 308*d* (with both antennas and RF heads) may be relatively large (1×8, as a numerical example) in a laptop, or relatively small (1×4, as a numerical example) in a smartphone.

Figure 3E:
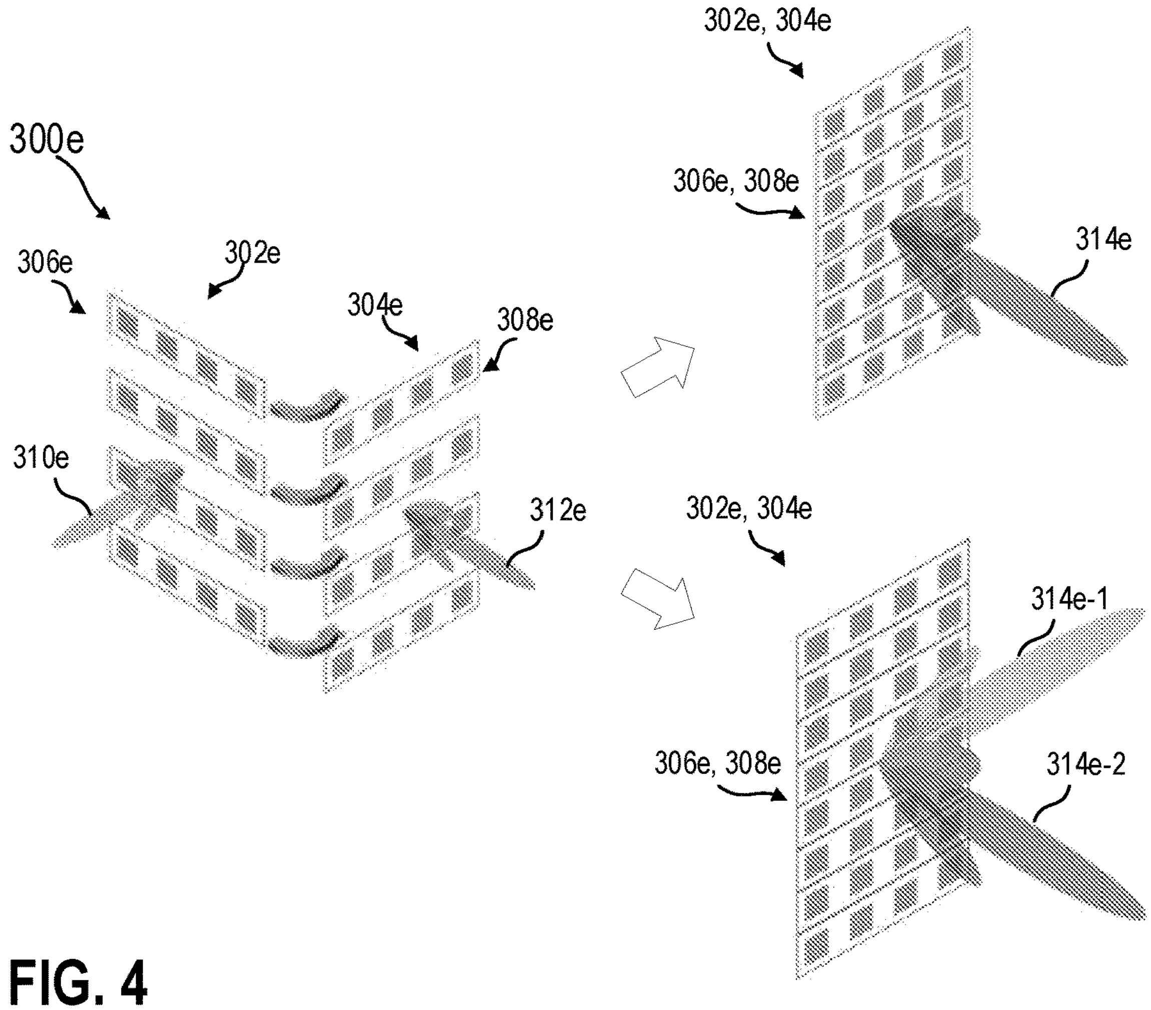

FIG. 3E illustrates, as a further example, a base station 300*e*. For a small cell base-station application, where spatial movement may not be inherent, a simple but intentional movement may provide additional re-configurability of the antenna array modules 306*e*, 308*e* targeting different use case or different situational needs. The hardware flexibility may further enhance the 5G promise of network re-configurability based on situational demands, by creating a modular beamforming array that may be used in "folded out" mode to cover different users at different beam angles, or in "stacked mode" where the array panels 306*e*, 308*e* may be cascaded for higher gain, for example to support Integrated Backhaul (iAB) deployments. As shown in FIG. 3E, a 4×4 antenna module 306*e* may be designed with larger element spacing in one direction (e.g., in the vertical axis, which is permissible since typically BS antennas require less scan range in the elevation plane), to accommodate another interleaved 4×4 array 308*e* that swivels about a center post. Such a mechanism enables the base-station 300*e* to change from targeting multiple users in different directions, to targeting longer range in a given direction in the case that the user density is low. In FIG. 3E two configurations of the radiation pattern(s) 314*e* of the combined antenna array in the interleaved position are shown. In a first configuration (top) the two 4×4 arrays provide a combined radiation pattern 314*e*, e.g. having an increased gain with respect to the individual non-interleaved arrays 306*e*, 308*e*. In a second configuration (bottom) the two 4×4 arrays provide separate radiation patterns 314*e*-1, 314*e*-2, that originate from the same source (the same plane, e.g. the combined array). The second configuration illustrates that the combined array may provide two beams (e.g., two user beams) in a same planar panel, and the two beams may point towards different directions (e.g., to reach users in different locations). The increase in array gain is not 6 dB because the array aperture is not doubled even if the element number is doubled (but the aperture efficiency increases compared to the spaced-out 4×4 array). For a typical microstrip patch array the increase in array gain may be about 3.5 dB with this mechanism.

Figure 4:
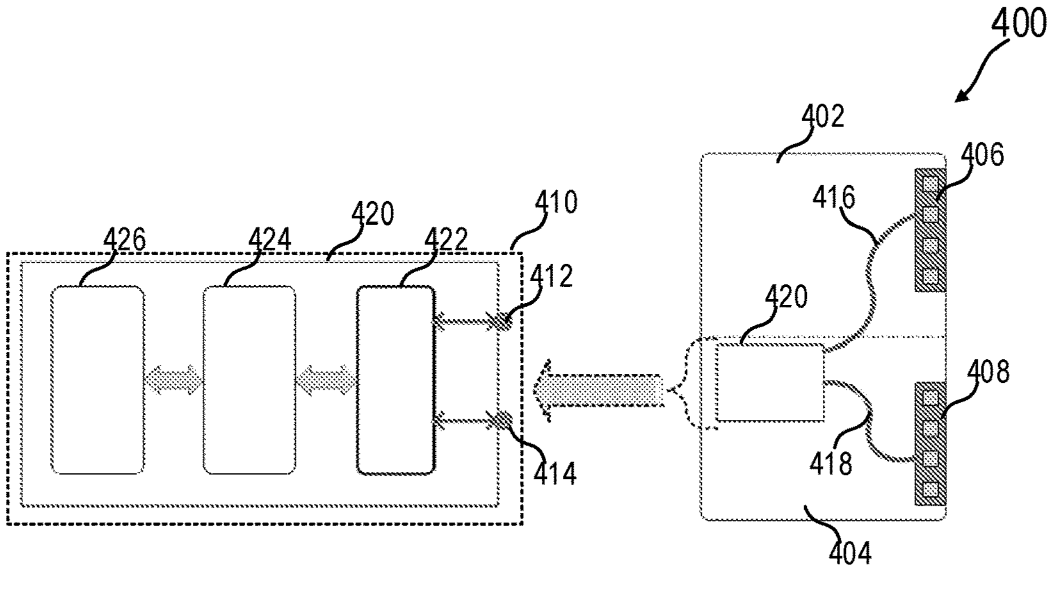
FIG. 4 exemplarily shows a device including a processor in a schematic view.

FIG. 4 exemplarily shows a device 400 in a schematic view. The device 400 may be an exemplary configuration of the device 100 described in relation to FIG. 1 to FIG. 2A. The device 400 may include portions that are movable with respect to one another, e.g. a first portion 402 (including a first antenna array 406) and a second portion 404 (including a second antenna array 408) that are movable with respect to one another. The device 400 may include a processor 420 configured to control an operation of the antenna arrays 406, 408. The processor 420 may be an exemplary configuration of the processor 220 described in relation to FIG. 2A to FIG. 2D. The processor 420 of the device 400 is shown in more detail in the inset 410. The processor 420 (also referred to herein as processing circuit or processing circuitry) may be configured to deliver 2 to 1 combining in coherent antenna case, or 2 to 2 routing to transceiver core in diversity antenna case. FIG. 4 may exemplarily show mmW hardware in a BS, CPE, and/or UE.

Illustratively, FIG. 4 shows a 5G mmW hardware and silicon system with the capability of combining two 1×4 array signals coherently into one 2×4 array. The signals may be phase-aligned/coherent when the two 1×4 arrays are configured to be a single 2×4 array. Different programming of the beamforming phase shifters with different codebook mapping for the 1×4 array and 2×4 array use cases may provide the desired phase-alignment. As an exemplary configuration, the processor 420 may include a coherent combiner or splitter 422 (or a diversity router, as another example), a transceiver core 424, and a MODEM 426 (e.g., a 5G MODEM Baseband). The processor 420 may be coupled with the antenna arrays 406, 408 at respective cable connectors 412, 414 (e.g., via a respective cable 416, 418).

Figure 5A:
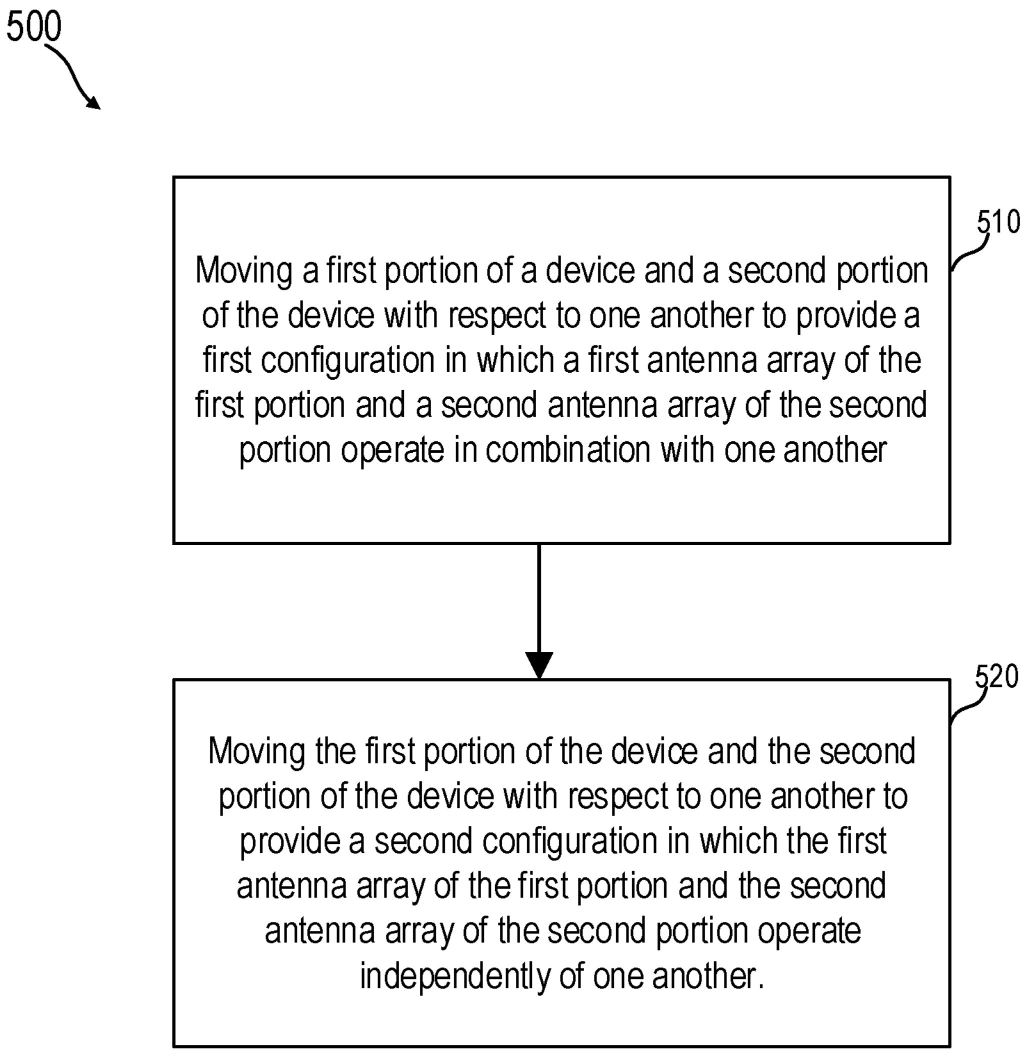
FIG. 5A exemplarily shows a flow diagram of a method of operating a device.

FIG. 5A exemplarily shows a flow diagram of a method 500 of operating a device (e.g., the device 100, 300*a*, 300*b*, 300*c*, 300*d*, 300*e*, 400 described in relation to FIG. 1 to FIG. 4).

The method 500 may include, in 510, moving a first portion of the device and a second portion of the device with respect to one another to provide a first configuration in which a first antenna array (or an individual first antenna element) of the first portion and a second antenna array (or an individual second antenna element) of the second portion operate in combination with one another (e.g., in which the first antenna array and the second antenna array form a combined antenna array).

The method 500 may include, in 520, moving the first portion of the device and the second portion of the device with respect to one another to provide a second configuration in which the first antenna array of the first portion and the second antenna array of the second portion operate independently of one another (e.g., in which the first antenna array and the second antenna array operate as switched diversity antennas).

Moving the first portion of the device and the second portion of the device with respect to one another may include, for example, controlling an actuation component (e.g., a motor) to drive the movement of the first portion and/or of the second portion.

Figure 5B:
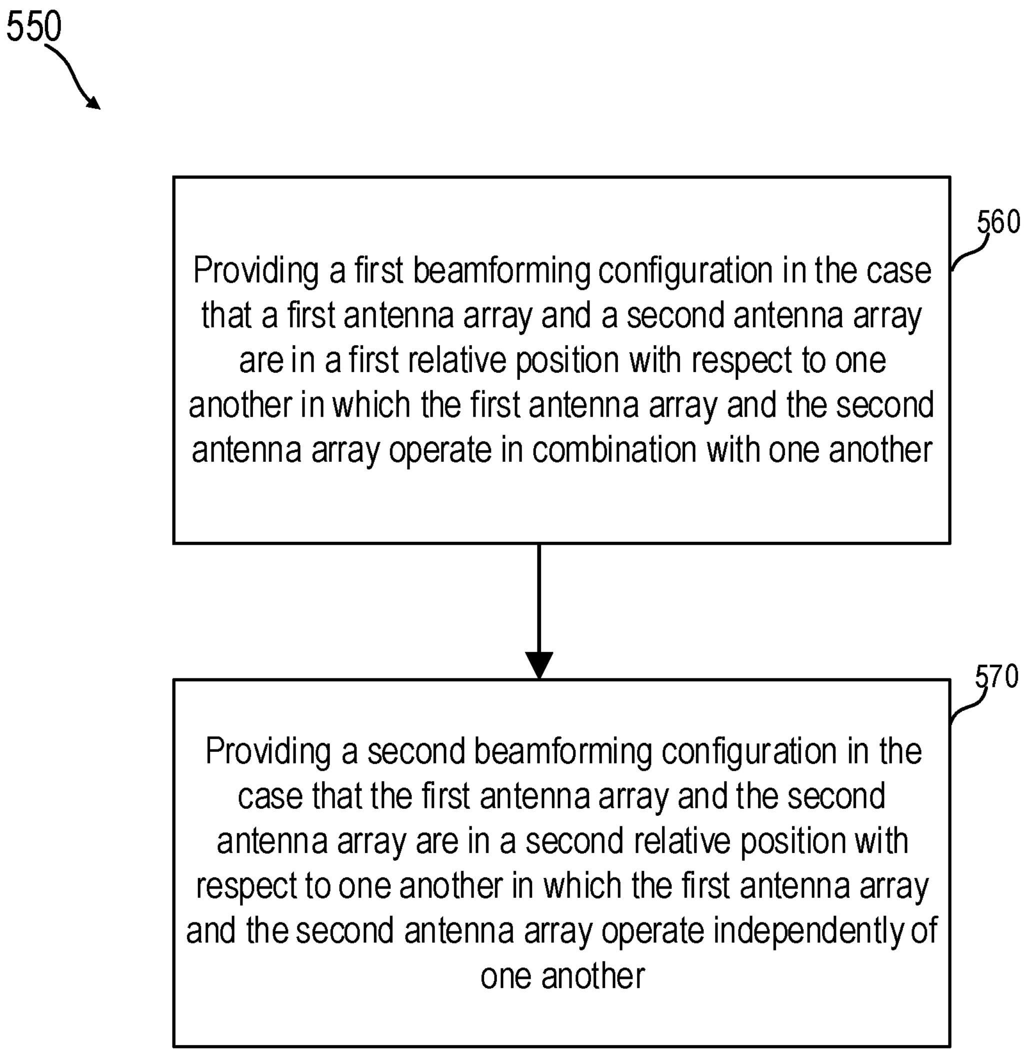
FIG. 5B exemplarily shows a flow diagram of a method of operating an antenna array.

FIG. 5B exemplarily shows a flow diagram of a method 550 of operating antenna arrays (e.g., the antenna arrays 206, 208, 306*a*, 306*b*, 306*c*, 306*d*, 306*e*, 308*a*, 308*b*, 308*c*, 308*d*, 308*e*, 406, 408 described in relation to FIG. 1 to FIG. 4). It is understood that the aspects of the method 550 in relation to operating antenna arrays may correspondingly apply to operating individual antenna elements.

The method 550 may include, in 560, providing a first beamforming configuration in the case that a first antenna array and a second antenna array are in a first relative position with respect to one another in which the first antenna array and the second antenna array operate in combination with one another. As an example, the first beamforming configuration may provide a coherent combination of the radiation patterns of the first antenna array and the second antenna array to provide a combined radiation pattern. As another example, the first beamforming configuration may provide separate radiation patterns of the first antenna array and the second antenna array in a same plane (e.g., originating from a same plane and pointing towards different directions).

The method 550 may include, in 570, providing a second beamforming configuration in the case that the first antenna array and the second antenna array are in a second relative position with respect to one another in which the first antenna array and the second antenna array operate independently of one another. The second beamforming configuration may provide separate radiation patterns of the first antenna array and the second antenna array (e.g., radiation patterns in separate planes, e.g. radiation patterns that have the respective azimuth planes that are not parallel to one another and/or the respective elevation planes that are not parallel to one another).

In the following, various examples are provided that may include one or more aspects described above with reference to a device (e.g., the device 100, 300*a*, 300*b*, 300*c*, 300*d*, 300*e*, 400), and a method (e.g., the method 500, 550). It may be intended that aspects described in relation to the device may apply also to the method, and vice versa.

Example 1 is a device including: a first portion including a first antenna element; and a second portion including a second antenna element. The first portion and the second portion are movable with respect to one another. The first antenna element and the second antenna element are arranged such that in a first relative position of the first portion and the second portion with respect to one another the first antenna element and the second antenna element operate in combination with one another, and in a second relative position of the first portion and the second portion with respect to one another the first antenna element and the second antenna element operate independently of one another.

In example 2, the device according to example 1 may optionally further include that in the second relative position of the first portion and the second portion with respect to one another the first antenna element and the second antenna element form a combined antenna array, and that in the second relative position of the first portion and the second portion with respect to one another the first antenna element and the second antenna element operate as diversity antennas with respect to one another.

In example 3, the device according to example 2 may optionally further include that in the second relative position of the first portion and the second portion with respect to one another the first antenna element has a first gain and the second antenna element has a second gain, and that in the first relative position of the first portion and the second portion with respect to one another the combined antenna array has a third gain greater than the first gain and greater than the second gain.

In example 4, the device according to example 2 or 3 may optionally further include that in the second relative position of the first portion and the second portion with respect to one another the first antenna element has a first antenna aperture and the second antenna element has a second antenna aperture, and that in the first relative position of the first portion and the second portion with respect to one another the combined antenna array has a third antenna aperture greater than the first antenna aperture and greater than the second antenna aperture.

In example 5, the device according to any one of examples 1 to 4 may optionally further include that the first antenna array and the second antenna array are configured (e.g., aligned) such that in the first relative position of the first portion and the second portion with respect to one another a first radiation pattern corresponding to the first antenna element and a second radiation pattern corresponding to the second antenna element point towards a same direction as a combined radiation pattern, and that the first antenna array and the second antenna array are configured such that in the second relative position of the first portion and the second portion with respect to one another the first radiation pattern corresponding to the first antenna element and the second radiation pattern corresponding to the second antenna element point towards different directions (in different planes).

As a further example, the first antenna array and the second antenna array may be configured such that in the first relative position of the first portion and the second portion with respect to one another the first radiation pattern of the first antenna element and the second radiation pattern of the second antenna element may be separate (individual) radiation patterns in a same plane. Illustratively, in the first relative position the first radiation pattern of the first antenna element and the second radiation pattern of the second antenna element may originate (in operation) from a same plane and point towards different directions. In the second relative position the first radiation pattern of the first antenna element and the second radiation pattern of the second antenna element may originate from different planes.

In example 6, the device according to any one of examples 1 to 5 may optionally further include a processor configured to provide a first beamforming configuration in the case that the first portion and the second portion are in the first relative position with respect to one another, and to provide a second beamforming configuration in the case that the first portion and the second portion are in the second relative position with respect to one another.

In example 7, the device according to example 6 may optionally further include that the first beamforming configuration includes a coherent combination of the first radiation pattern corresponding to the first antenna element and of the second radiation pattern corresponding to the second antenna element to provide the combined radiation pattern, and that the second beamforming configuration includes a spatial separation (in different planes) of the first radiation pattern corresponding to the first antenna element and of the second radiation pattern corresponding to the second antenna element.

As another example, additionally or alternatively, the first beamforming configuration may include a spatial separation within a same plane of the first radiation pattern corresponding to the first antenna element and of the second radiation pattern corresponding to the second antenna element.

In example 8, the device according to example 6 or 7 may optionally further include that the first antenna element is corresponding to a first phase shifter, that the second antenna element is corresponding to a second phase shifter, and that the first beamforming configuration includes a first phase shift that the first phase shifter provides and/or a second phase shift that the second phase shifter provides to provide a phase alignment between a first signal that the first antenna element receives and a second signal that the second antenna element receives in the case that the first antenna element and second antenna element operate as receiving antennas, or to provide a phase alignment between a first signal that the first antenna element transmits and a second signal that the second antenna element transmits in the case that the first antenna element and second antenna element operate as transmitting antennas.

In example 9, the device according to any one of examples 6 to 8 may optionally further include a memory storing a table mapping a beamforming configuration with a respective relative position of the first portion and the second portion with respect to one another.

In example 10, the device according to example 9 may optionally further include that the table is mapping a first phase shift that the first phase shifter provides and/or a second phase shift that the second phase shifter provides with a respective relative position of the first portion and the second portion with respect to one another.

In example 11, the device according to any one of examples 6 to 10 may optionally further include that in the first relative position of the first portion and the second portion with respect to one another, the processor is further configured to coherently combine a first signal that the first antenna element receives and a second signal that the second antenna element receives (or transmits) with one another.

In example 12, the device according to any one of examples 1 to 11 may optionally further include that in the first relative position of the first portion and the second portion with respect to one another the first antenna element and the second antenna element are aligned with one another along one of a vertical direction or a horizontal direction.

In example 13, the device according to example 12 may optionally further include that the coherent combination of the first signal that the first antenna element receives and the second signal that the second antenna element receives (or transmits) with one another includes a correction of a misalignment between the first antenna element and the second antenna element.

In example 14, the device according to any one of examples 1 to 13 may optionally further include that the first antenna element and the second antenna element are configured for transmission/reception of radio frequency waves having a same wavelength.

In example 15, the device according to any one of examples 1 to 14 may optionally further include that the first antenna element and the second antenna element are configured for transmission/reception of radio frequency waves having a wavelength in a range from 1 mm to 100 mm, for example in the range from 1 mm to 10 mm.

In example 16, the device according to any one of examples 1 to 15 may optionally further include a third portion including a third antenna element. The third portion and at least one of the first portion and/or the second portion are movable with respect to one another. The first antenna element and the third antenna element are arranged such that in a third relative position of the first portion and the third portion with respect to one another the first antenna element and the third antenna element operate in combination with one another, and in a fourth relative position of the first portion and the third portion with respect to one another the first antenna element and the third antenna element operate independently of one another. Additionally or alternatively, the second antenna element and the third antenna element are arranged such that in a fifth relative position of the second portion and the third portion with respect to one another the second antenna element and the third antenna element operate in combination with one another, and in a sixth relative position of the second portion and the third portion with respect to one another the second antenna element and the third antenna element operate independently of one another.

In example 17, the device according to any one of examples 1 to 16 may optionally further include at least one alignment element configured to indicate an alignment of the first portion with respect to the second portion.

In example 18, the device according to example 17 may optionally further include that the first portion is corresponding to a first alignment element, that the second portion is corresponding to a second alignment element, and that the first alignment element and the second alignment element are configured to engage with one another in the case that the first portion and the second portion are in the first relative position with respect to one another.

In example 19, the device according to any one of examples 6 to 18 may optionally further include that the processor is further configured to instruct a relative movement of the first portion and the second portion with respect to one another.

In example 20, the device according to example 19 may optionally further include that the processor is configured to bring the first portion and the second portion in the first relative position or in the second relative position with respect to one another as a function of a current transmission/reception scenario of the device. As an example, the processor may be configured to control an actuation component to cause a movement of the first portion and the second portion with respect to one another to bring the first portion and the second portion in the first relative position or in the second relative position.

In example 21, the device according to any one of examples 1 to 20 may optionally further include that a movement of the first portion and the second portion with respect to one another includes at least one of a folding, a docking, a sliding, a rotation, and/or a swivel of the first portion and the second portion with respect to one another.

In example 22, the device according to any one of examples 1 to 21 may optionally further include that the device is or includes one of a base station, a user equipment, a customer premise equipment, a laptop, a tablet, a 2-in-1 device, or a smartphone.

In example 23, the device according to any one of examples 1 to 22 may optionally further include that in the first relative position of the first portion and the second portion with respect to one another one of the first antenna element or the second antenna element behaves as a passive antenna.

As a further example, at least one of, or each of, the first portion and/or the second portion may include one or more dummy elements and/or one or more reflective elements. The one or more dummy elements may be configured to enhance radiation via parasitic excitation. The one or more reflective elements may be configured to modify and/or redirect the radiation pattern of the first antenna element and/or of the second antenna element.

In example 24, the device according to any one of examples 1 to 23 may optionally further include that the first portion includes a first antenna array, the first antenna array including the first antenna element and at least a further antenna element, that the second portion includes a second antenna array, the second antenna array including the second antenna element and at least a further antenna element, and that in the first relative position of the first portion and the second portion with respect to one another the first antenna array and the second antenna array operate in combination with one another, and in the second relative position of the first portion and the second portion with respect to one another the first antenna array and the second antenna array operate independently of one another.

In example 25, the device according to example 24 may optionally further include that in the first relative position of the first portion and the second portion with respect to one another the first antenna array and the second antenna array form the combined antenna array, and that in the second relative position of the first portion and the second portion with respect to one another the first antenna array and the second antenna array operate as diversity antennas with respect to one another.

In example 26, the device according to example 24 or 25 may optionally further include that the first antenna array and the second array have a same periodicity.

In example 27, the device according to any one of examples 24 to 26 may optionally further include that a periodicity of the first antenna array and the second array is in the range from a quarter wavelength to a full wavelength (with respect to a wavelength of RF signals that the antenna arrays may transmit/receive).

In example 28, the device according to example 26 or 27 may optionally further include that the periodicity of the first antenna array and the second array is a half wavelength.

In example 29, the device according to any one of examples 26 to 28 may optionally further include that the combined antenna array has substantially the same periodicity as the first antenna array and the second array.

In example 30, the device according to any one of examples 26 to 29 may optionally further include that a coherent combination of a first signal that the first antenna array receives and a second signal that the second antenna array receives with one another includes a correction of a difference between the periodicity of the combined antenna array and the periodicity of the first and second antenna arrays.

In example 31, the device according to any one of examples 24 to 30 may optionally further include that the first antenna array includes a number of antenna elements in the range from 2 to 256, for example in the range from 4 to 8, for example in the range from 16 to 64, and/or that the second antenna array includes a number of antenna elements in the range from 2 to 256, for example in the range from 4 to 8, for example in the range from 16 to 64.

In example 32, the device according to any one of examples 24 to 31 may optionally further include that the antenna elements of the first antenna array are disposed along one direction to provide a one dimensional antenna array or along two directions to provide a two dimension array, and/or that the antenna elements of the second antenna array are disposed along one direction to provide a one dimensional antenna array or along two directions to provide a two dimension array.

In example 33, the device according to any one of examples 24 to 32 may optionally further include that in the first relative position of the first portion and the second portion with respect to one another at least one antenna element of the first antenna array or at least one antenna element of the second antenna array behaves as a passive antenna (or is configured as a passive antenna array).

Example 34 is a device including: a first portion including a first antenna array; and a second portion including a second antenna array. The first portion and the second portion are movable with respect to one another. The first antenna array and the second antenna array are arranged such that in a first relative position of the first portion and the second portion with respect to one another the first antenna array and the second antenna array operate in combination with one another, and in a second relative position of the first portion and the second portion with respect to one another the first antenna array and the second antenna array operate independently of one another.

In example 35, the device according to example 34 may include one or more, or all the features of the device according to any one of examples 1 to 33, adapted accordingly.

Example 36 is a device including: a first antenna array; a second antenna array. The first antenna array and the second antenna array are movable with respect to one another. The device further includes a processor configured to: provide a first beamforming configuration for the first antenna array and the second antenna array in the case that the first antenna array and the second antenna array are in a first relative position with respect to one another in which the first antenna array and the second antenna array operate in combination with one another, and provide a second beamforming configuration for the first antenna array and the second antenna array in the case that the first antenna array and the second antenna array are in a second relative position with respect to one another in which the first antenna array and the second antenna array operate independently of one another.

In example 37, the device according to example 36 may include one or more, or all the features of the device according to any one of examples 1 to 33, adapted accordingly.

Example 38 is a device including: a first portion including a first antenna array; and a second portion including a second antenna array. The first portion and the second portion are movable with respect to one another. The first portion includes a plurality of first sub-portions, each first sub-portion of the plurality of first sub-portions including a respective sub-array of the first antenna array. The second portion includes a plurality of second sub-portions, each second sub-portion of the plurality of second sub-portions including a respective sub-array of the second antenna array A spacing along one direction of the plurality of first sub-portions and of the plurality of second sub-portions is configured such that in a first relative position of the first portion and the second portion with respect to one another the plurality of first sub-portions and the plurality of second sub-portions are interleaved with one another in such a way that the first antenna array and the second antenna array form a combined antenna array, and in a second relative position of the first portion and the second portion with respect to one another the plurality of first sub-portions and the plurality of second sub-portions are separated from one another and the first antenna array and the second antenna array operate independently of one another.

In example 39, the device according to example 38 may include one or more, or all the features of the device according to any one of examples 1 to 33, adapted accordingly.

Example 40 is a processor configured to: provide a first beamforming configuration in the case that a first antenna element and a second antenna element are in a first relative position with respect to one another in which the first antenna element and the second antenna element operate in combination with one another, and provide a second beamforming configuration in the case that the first antenna element and the second antenna element are in a second relative position with respect to one another in which the first antenna element and the second antenna element operate independently of one another.

A system may include the processor according to example 40, e.g. a system further including antenna elements/arrays disposed on movable portions (e.g., of a device).

Example 41 is a method of operating a device, the method including: moving a first portion of the device and a second portion of the device with respect to one another to provide a first configuration in which a first antenna array of the first portion and a second antenna array of the second portion operate in combination with one another; and moving the first portion of the device and the second portion of the device with respect to one another to provide a second configuration in which the first antenna array of the first portion and the second antenna array of the second portion operate independently of one another.

In example 42, the method according to example 41 may include one or more, or all the features of the device according to any one of examples 1 to 33, adapted accordingly.

Example 43 is an apparatus comprising means for carrying out the method of example 41 or 42.

Example 44 is a method of operating antenna elements, the method including: providing a first beamforming configuration in the case that a first antenna element and a second antenna element are in a first relative position with respect to one another in which the first antenna element and the second antenna element operate in combination with one another, and providing a second beamforming configuration in the case that the first antenna element and the second antenna element are in a second relative position with respect to one another in which the first antenna element and the second antenna element operate independently of one another.

In example 45, the method according to example 44 may include one or more, or all the features of the device according to any one of examples 1 to 33, adapted accordingly.

Example 46 is an apparatus comprising means for carrying out the method of example 44 or 45.

Example 47 is a method of operating antenna arrays, the method including: providing a first beamforming configuration in the case that a first antenna array and a second antenna array are in a first relative position with respect to one another in which the first antenna array and the second antenna array operate in combination with one another, and providing a second beamforming configuration in the case that the first antenna array and the second antenna array are in a second relative position with respect to one another in which the first antenna array and the second antenna array operate independently of one another.

In example 48, the method according to example 47 may include one or more, or all the features of the device according to any one of examples 1 to 33, adapted accordingly.

Example 49 is an apparatus comprising means for carrying out the method of example 47 or 48.

Example 50 is one or more non-transient computer readable media, configured to cause one or more processors, when executed, to perform a method of operating antenna arrays. The method stored in the non-transient computer readable media includes providing a first beamforming configuration in the case that a first antenna array and a second antenna array are in a first relative position with respect to one another in which the first antenna array and the second antenna array operate in combination with one another. The method furtehr includes providing a second beamforming configuration in the case that the first antenna array and the second antenna array are in a second relative position with respect to one another in which the first antenna array and the second antenna array operate independently of one another.

Example 51 is one or more non-transient computer readable media, configured to cause one or more processors, when executed, to perform a method of operating antenna elements. The method stored in the non-transient computer readable media includes providing a first beamforming configuration in the case that a first antenna element and a second antenna element are in a first relative position with respect to one another in which the first antenna element and the second antenna element operate in combination with one another. The method further includes providing a second beamforming configuration in the case that the first antenna element and the second antenna element are in a second relative position with respect to one another in which the first antenna element and the second antenna element operate independently of one another.

Example 52 is one or more non-transient computer readable media, configured to cause one or more processors, when executed, to perform a method of operating a device. The method stored in the non-transient computer readable media includes moving a first portion of the device and a second portion of the device with respect to one another to provide a first configuration in which a first antenna array of the first portion and a second antenna array of the second portion operate in combination with one another; and moving the first portion of the device and the second portion of the device with respect to one another to provide a second configuration in which the first antenna array of the first portion and the second antenna array of the second portion operate independently of one another.

The word "exemplary" is used herein to mean "serving as an example, instance, or illustration." Any example or design described herein as "exemplary" is not necessarily to be construed as preferred or advantageous over other examples or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one.

The terms "processor" or "controller" as, for example, used herein may be understood as any kind of technological entity that allows handling of data. The data may be handled according to one or more specific functions that the processor or controller execute. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "software" refers to any type of executable instruction, including firmware.

This disclosure may utilize or be related to wireless communication technologies. While some examples may refer to specific wireless communication technologies, the examples provided herein may be similarly applied to various other wireless communication technologies, both existing and not yet formulated, particularly in cases where such wireless communication technologies share similar features as disclosed regarding the following examples.

The term "connected" can be understood in the sense of a (e.g. mechanical and/or electrical), e.g. direct or indirect, connection and/or interaction. For example, several elements can be connected together mechanically such that they are physically retained (e.g., a plug connected to a socket) and electrically such that they have an electrically conductive path (e.g., signal paths exist along a communicative chain).

While the above descriptions and connected figures may depict electronic device components as separate elements, skilled persons will appreciate the various possibilities to combine or integrate discrete elements into a single element. Such may include combining two or more circuits from a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc. Also, it is appreciated that particular implementations of hardware and/or software components are merely illustrative, and other combinations of hardware and/or software that perform the methods described herein are within the scope of the disclosure.

It is appreciated that implementations of methods detailed herein are exemplary in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

While the disclosure has been particularly shown and described with reference to specific embodiments, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A device comprising:

a first portion comprising a first antenna array, the first antenna array comprising a plurality of first sub-portions that are spaced apart from one another within a first plane by a first spacing along a first axis of the first plane and by a second spacing along a second axis of the first plane, wherein the first axis is orthogonal to the second axis, wherein the first spacing is greater than the second spacing; and a second portion comprising a second antenna array, the second antenna array comprising a plurality of second sub-portions that are spaced apart from one another within a second plane by the first spacing along a first axis of the second plane and by the second spacing along a second axis of the second plane, wherein the first axis of the second plane is orthogonal to the second axis of the second plane, wherein each one of the first sub-portions and second sub-portions is an individual antenna element capable of transmitting and/or receiving radio frequency communication signals, wherein the first portion and the second portion are movable with respect to one another between:

a first relative position in which the first plane and the second plane are coplanar in a same plane; and a second relative position in which the first plane and the second plane are non-coplanar, wherein, in the first relative position, the plurality of first sub-portions interleave with the plurality of second sub-portions to form a combined antenna array of interleaved sub-portions in the same plane, wherein the interleaved sub-portions are spaced apart from one another with a uniform spacing along a first axis of the same plane and along a second axis of the same plane, wherein the first axis of the same plane is orthogonal to the second axis of the same plane, wherein the uniform spacing is equal to the second spacing, and wherein in the second relative position, the plurality of first sub-portions and the plurality of second sub-portions are separated from one another and the first antenna array and the second antenna array operate independently of one another.

2. The device according to claim 1, wherein, in the first relative position, the first antenna array and the second antenna array form a combined antenna array, and wherein, in the second relative position, the first antenna array and the second antenna array operate as diversity antennas with respect to one another.

3. The device according to claim 2, wherein, in the second relative position, the first antenna array has a first gain and the second antenna array has a second gain, and wherein, in the first relative position, the combined antenna array has a third gain greater than the first gain and greater than the second gain.

4. The device according to claim 1, wherein the first antenna array is configured to radiate a first radiation pattern and the second antenna array is configured to radiate a second radiation pattern, wherein, in the first relative position, the first radiation pattern and the second radiation pattern point towards a same direction as a combined radiation pattern, wherein, in the second relative position, the first radiation pattern and the second radiation pattern point towards different directions.

5. The device according to claim 4, wherein, in the first relative position, the first radiation pattern and the second radiation pattern are separate radiation patterns that extend outward from a same plane.

6. The device according to claim 4, the device further comprising:

a processor configured to provide a first beamforming configuration based on the first portion and the second portion in the first relative position, wherein the processor is further configured to provide a second beamforming configuration based on the first portion and the second portion in the second relative position.

7. The device according to claim 6, wherein the first beamforming configuration comprises a coherent combination of the first radiation pattern and the second radiation pattern to provide the combined radiation pattern, and wherein the second beamforming configuration comprises a spatial separation of the first radiation pattern and the second radiation pattern.

8. The device according to claim 6, wherein the first beamforming configuration comprises a spatial separation of the first radiation pattern and the second radiation pattern, wherein the spatial separation is within a same plane.

9. The device according to claim 6, the device further comprising:

a memory configured to store a table of beamforming configurations, wherein the table maps a beamforming configuration with a respective relative position of the first portion and the second portion with respect to one another.

10. The device according to claim 6, wherein, in the first relative position, the processor is further configured to coherently combine with one another a first signal that the first antenna array receives and a second signal that the second antenna array receives.

11. The device according to claim 1, wherein, in the first relative position, the plurality of first sub-portions and the plurality of second sub-portions are aligned with one another along at least one of a vertical direction and/or a horizontal direction.

12. The device according to claim 10, wherein the coherent combination comprises a correction of a misalignment between the first antenna array and the second antenna array.

13. The device according to claim 1, further comprising:

at least one alignment element configured to indicate an alignment of the first portion with respect to the second portion.

14. The device according to claim 6, wherein the processor is further configured to instruct a relative movement of the first portion and the second portion with respect to one another.

15. The device according to claim 14, wherein the processor is configured to bring the first portion and the second portion into the first relative position or the second relative position as a function of a current transmission/reception scenario of the device.

16. A device comprising:

a first portion comprising a first antenna array, the first antenna array comprising a plurality of first sub-portions; and a second portion comprising a second antenna array, the second antenna array comprising a plurality of second sub-portions, wherein each one of the first sub-portions and second sub-portions is an individual antenna element capable of transmitting and/or receiving radio frequency communication signals, wherein the a plurality of first sub-portions are spaced apart from one another within a first plane by a first spacing along a first axis of the first plane and by a second spacing along a second axis of the first plane, wherein the first axis is orthogonal to the second axis, wherein the first spacing is greater than the second spacing, wherein the plurality of second sub-portions are spaced apart from one another within a second plane by the first spacing along a first axis of the second plane and by the second spacing along a second axis of the second plane, wherein the first portion and second portion are movable with respect to one another between:

a first relative position in which the first plane and the second plane are coplanar in a same plane; and a second relative position in which the first plane and the second plane are non-coplanar, wherein, in the first relative position, the plurality of first sub-portions interleave with the plurality of second sub-portions to form a combined antenna array of interleaved sub-portions in the same plane, wherein the interleaved sub-portions are spaced apart from one another with a uniform spacing along a first axis of the same plane and along a second axis of the same plane, wherein the first axis of the same plane is orthogonal to the second axis of the same plane, wherein the uniform spacing is equal to the second spacing, and wherein in the second relative position, the plurality of first sub-portions and the plurality of second sub-portions are separated from one another and the first antenna array and the second antenna array operate independently of one another.

17. The device according to claim 16, wherein, in the first relative position, a first radiation pattern corresponding to the first antenna array and a second radiation pattern corresponding to the second antenna array form a combined radiation pattern of the combined antenna array, or wherein, in the first relative position, a first radiation pattern corresponding to the first antenna array and a second radiation pattern corresponding to the second antenna array are radiation patterns in the same plane pointing towards different directions.

18. A method of operating a device, the method comprising:

moving a first portion of the device and a second portion of the device with respect to one another to provide a first configuration in which a first antenna array of the first portion and a second antenna array of the second portion operate in combination with one another; and moving the first portion of the device and the second portion of the device with respect to one another to provide a second configuration in which the first antenna array of the first portion and the second antenna array of the second portion operate independently of one another, wherein the first antenna array comprises a plurality of first sub-portions that are spaced apart from one another within a first plane by a first spacing along a first axis of the first plane and by a second spacing along a second axis of the first plane, wherein the first axis is orthogonal to the second axis, wherein the first spacing is greater than the second spacing, wherein the second antenna array comprises a plurality of second sub-portions that are spaced apart from one another within a second plane by the first spacing along a first axis of the second plane and by the second spacing along a second axis of the second plane, wherein the first axis of the second plane is orthogonal to the second axis of the second plane, wherein each one of the first sub-portions and second sub-portions is an individual antenna element capable of transmitting and/or receiving radio frequency communication signals, wherein, in the first configuration, the first plane and the second plane are coplanar in a same plane, wherein, in the second configuration, the first plane and the second plane are non-coplanar, wherein, in the first configuration, the plurality of first sub-portions interleave with the plurality of second sub-portions to form a combined antenna array of interleaved sub-portions in the same plane, wherein the interleaved sub-portions are spaced apart from one another with a uniform spacing along a first axis of the same plane and along a second axis of the same plane, wherein the first axis of the same plane is orthogonal to the second axis of the same plane, wherein the uniform spacing is equal to the second spacing, and wherein in the second configuration, the plurality of first sub-portions and the plurality of second sub-portions are separated from one another and the first antenna array and the second antenna array operate independently of one another.

* * * * *